United States Patent
Okuhara et al.

(10) Patent No.: US 10,661,744 B2
(45) Date of Patent: May 26, 2020

(54) HEAD PROTECTIVE AIRBAG APPARATUS

(71) Applicant: TOYODA GOSEI CO., LTD., Kiyosu-shi, Aichi-ken (JP)

(72) Inventors: Masaaki Okuhara, Kiyosu (JP); Koji Kawamura, Kiyosu (JP); Takashi Iida, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 36 days.

(21) Appl. No.: 16/021,446

(22) Filed: Jun. 28, 2018

(65) Prior Publication Data
US 2019/0001913 A1 Jan. 3, 2019

(30) Foreign Application Priority Data

Jun. 30, 2017 (JP) .................. 2017-128329
Jun. 30, 2017 (JP) .................. 2017-129322

(51) Int. Cl.
| | |
|---|---|
| *B60R 21/213* | (2011.01) |
| *B60R 21/26* | (2011.01) |
| *B60R 21/237* | (2006.01) |
| *B60R 21/232* | (2011.01) |
| *B60R 21/231* | (2011.01) |
| *B60R 21/00* | (2006.01) |
| *B60R 21/2338* | (2011.01) |

(52) U.S. Cl.
CPC .......... *B60R 21/213* (2013.01); *B60R 21/232* (2013.01); *B60R 21/237* (2013.01); *B60R 21/26* (2013.01); *B60R 21/2338* (2013.01); *B60R 2021/0048* (2013.01); *B60R 2021/23161* (2013.01)

(58) Field of Classification Search
CPC ..... B60R 21/232; B60R 21/213; B60R 21/26; B60R 21/2338; B60R 21/237; B60R 2021/23161; B60R 2021/0048
See application file for complete search history.

(56) References Cited

U.S. PATENT DOCUMENTS

| | | |
|---|---|---|
| 8,636,301 B1 | 1/2014 | Wang et al. |
| 2011/0079990 A1 | 4/2011 | Cheal et al. |

(Continued)

FOREIGN PATENT DOCUMENTS

| | | |
|---|---|---|
| JP | 2008-1197 A | 1/2008 |
| JP | 2012-20719 A | 2/2012 |
| JP | 2016-84125 A | 5/2016 |

*Primary Examiner* — Paul N Dickson
*Assistant Examiner* — Kurtis Nielson
(74) *Attorney, Agent, or Firm* — Posz Law Group, PLC

(57) ABSTRACT

An airbag has a bag main body and a connection member with a base side joined to the bag main body and a distal end side fixed to a circumferential window edge. The bag main body has end-side and normal inflation portions. A slit is formed between the end-side and normal inflation portions. The base side of the connection member is joined to the bag main body at a position on a front and upper side from the slit. The bag main body is pulled by the connection member that covers a vehicle exterior side of the end-side inflation portion, in which is inserted into the slit from the vehicle interior side toward the vehicle exterior side when the airbag is completely inflated, and a vicinity of a part of the end-side inflation portion, is oriented toward the vehicle interior side.

6 Claims, 20 Drawing Sheets

(56) References Cited

U.S. PATENT DOCUMENTS

| | | | |
|---|---|---|---|
| 2012/0313356 A1* | 12/2012 | Saimura | B60R 21/233 280/730.2 |
| 2013/0270805 A1 | 10/2013 | Kruse et al. | |
| 2014/0110923 A1* | 4/2014 | Maita | B60R 21/213 280/730.2 |
| 2015/0084316 A1* | 3/2015 | Okuhara | B60R 21/2338 280/729 |
| 2015/0151708 A1* | 6/2015 | Kawamura | B60R 21/232 280/728.2 |
| 2016/0107602 A1 | 4/2016 | Nakashima | |
| 2016/0114754 A1* | 4/2016 | Kawamura | B60R 21/2334 280/728.2 |
| 2016/0297394 A1* | 10/2016 | Fujiwara | B60R 21/237 |
| 2017/0088082 A1 | 3/2017 | Okuhara et al. | |
| 2017/0182967 A1* | 6/2017 | Suzuki | B60R 21/213 |
| 2018/0201220 A1* | 7/2018 | Sugimori | B60R 21/232 |

* cited by examiner

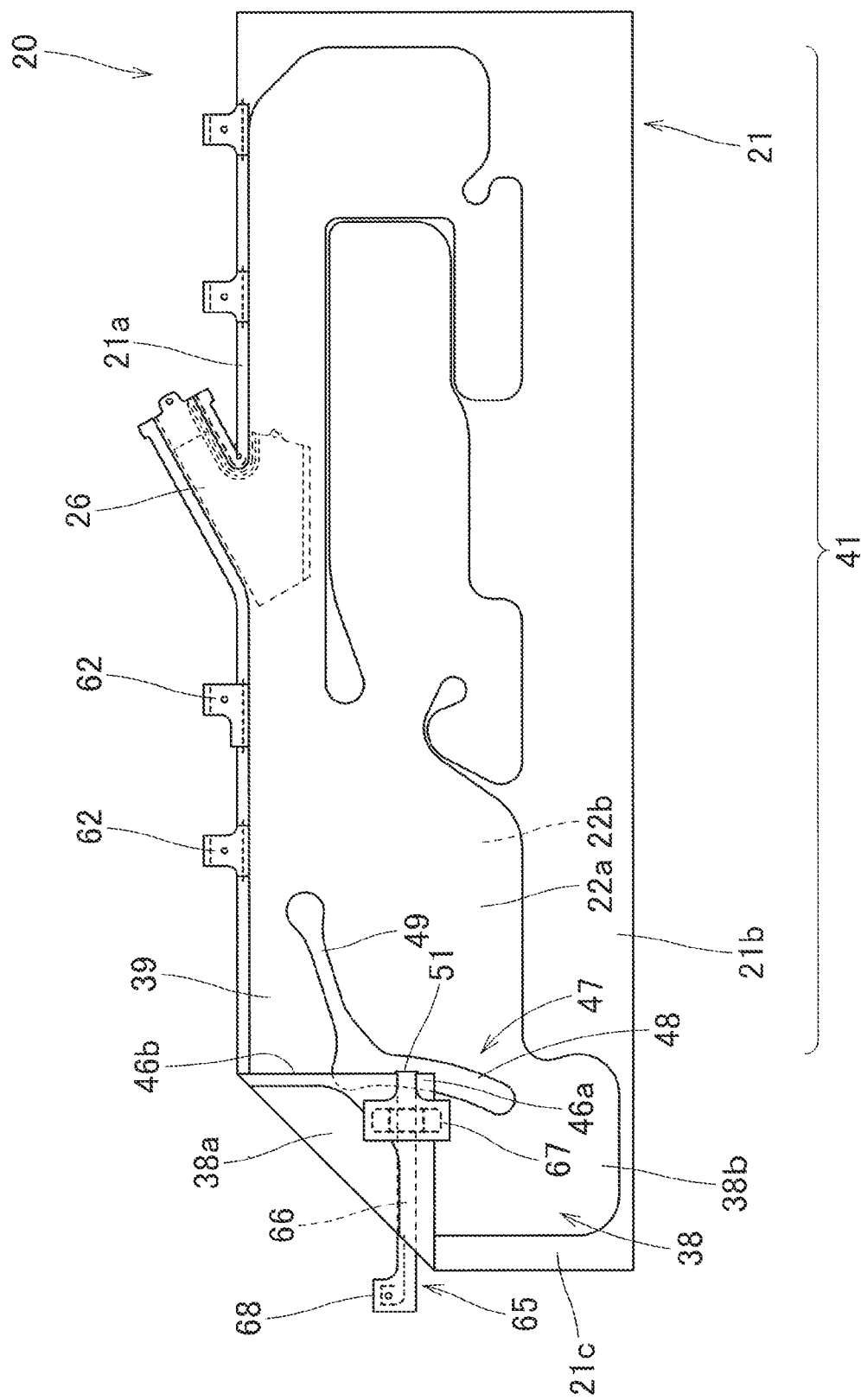

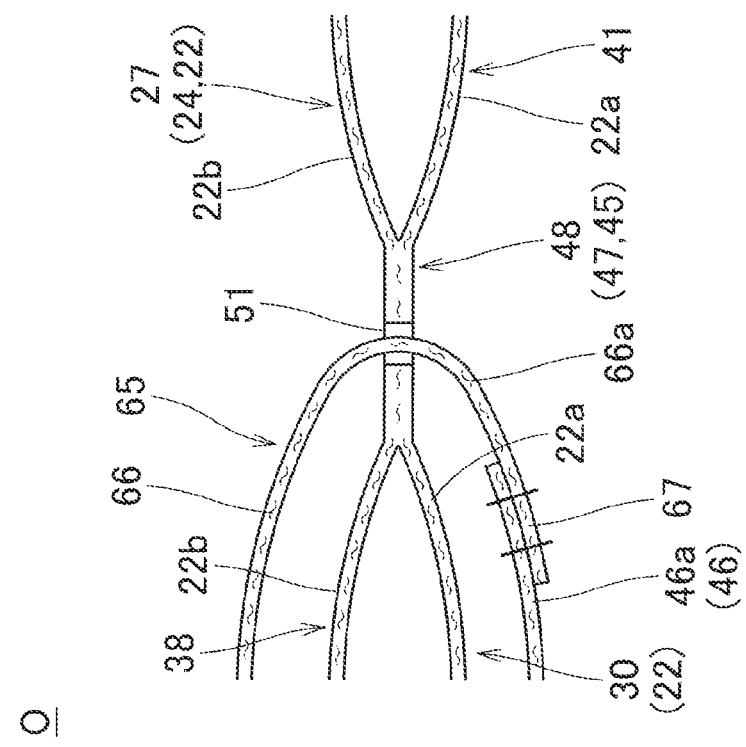
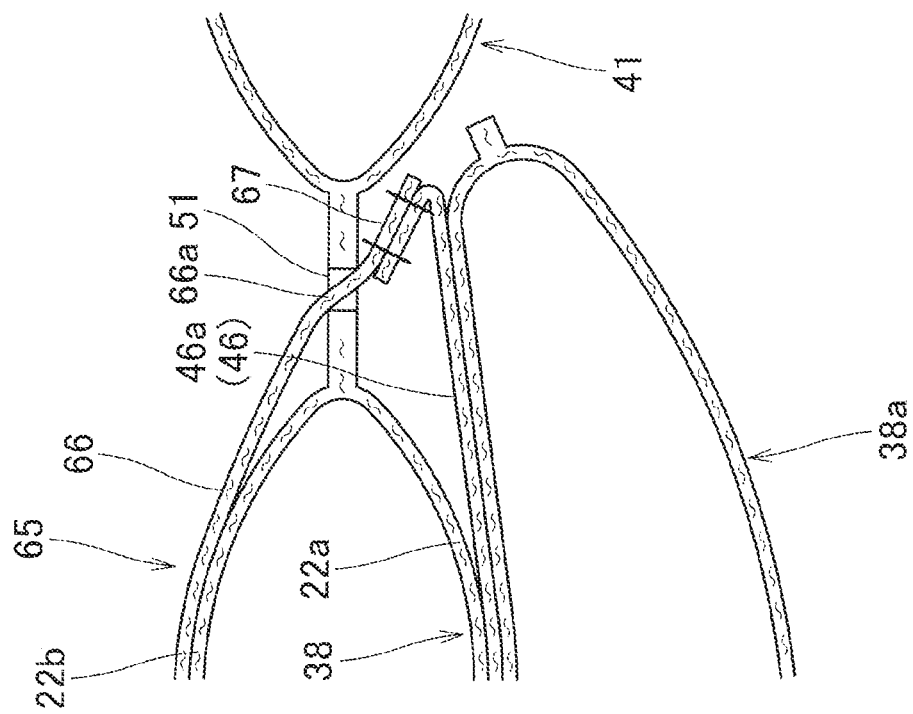
Fig. 4A
Fig. 4B

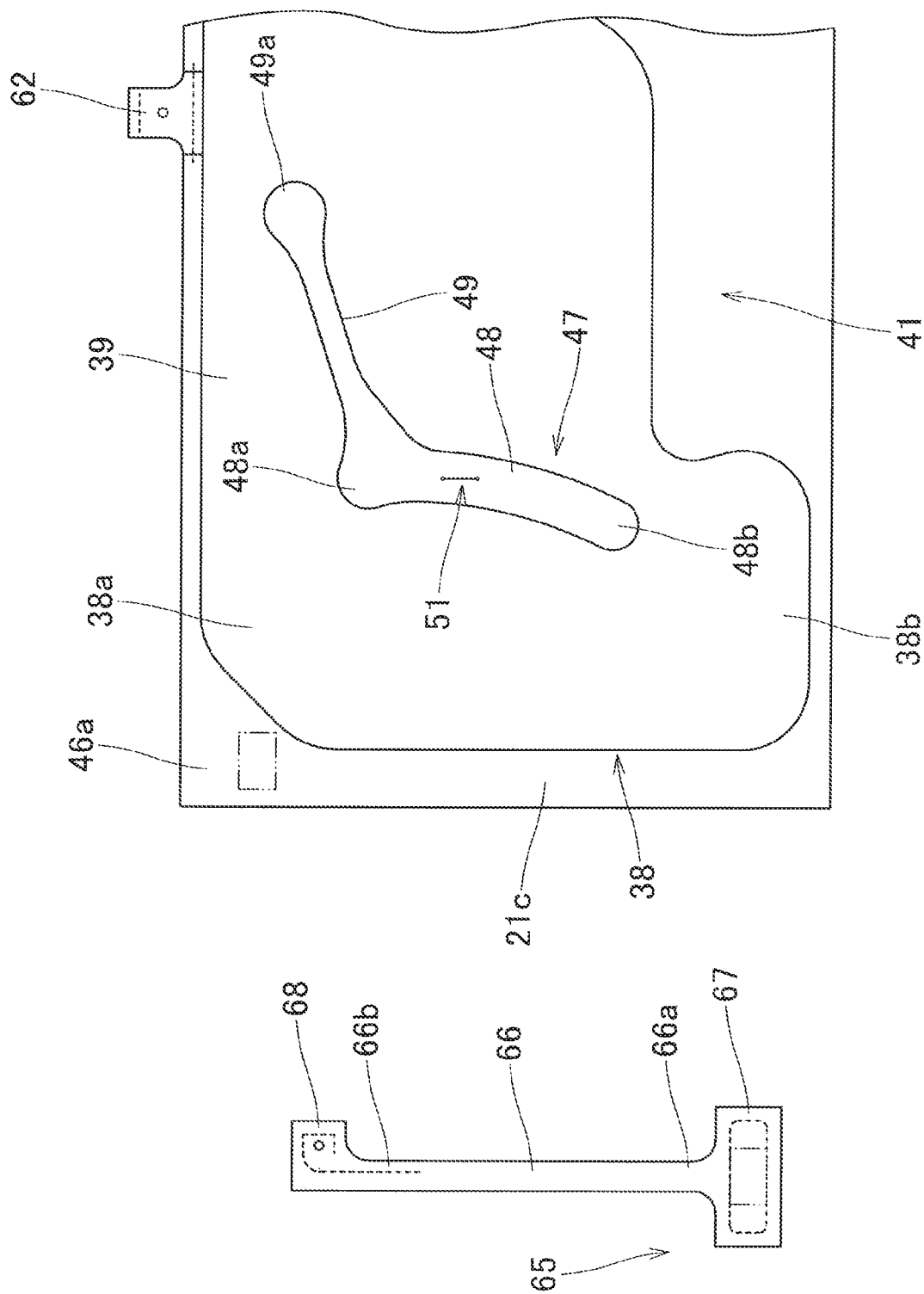

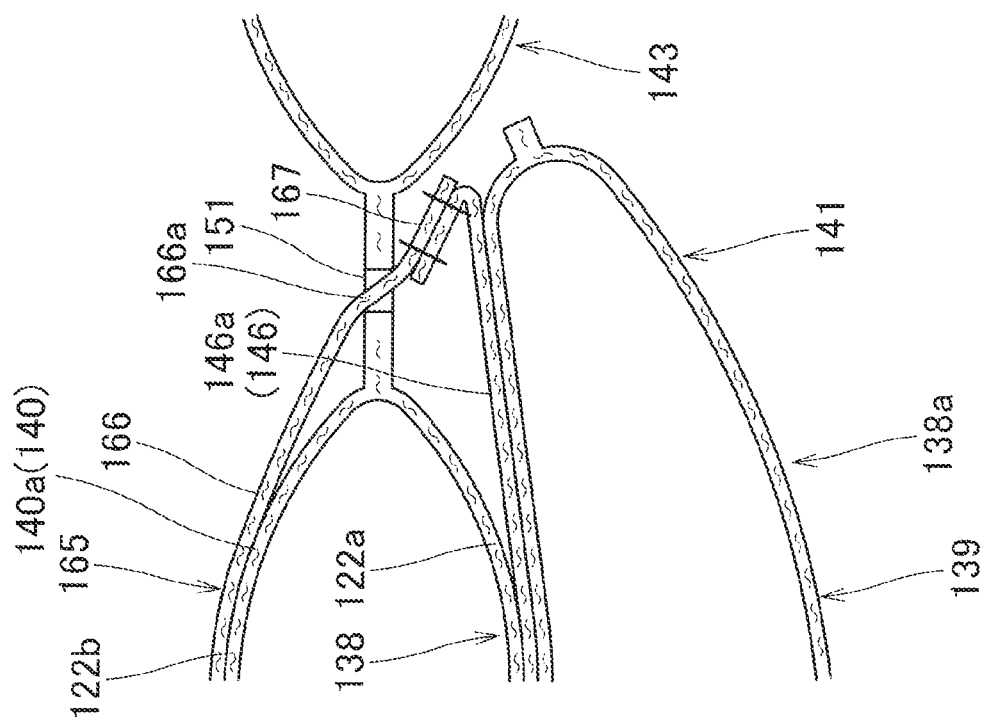
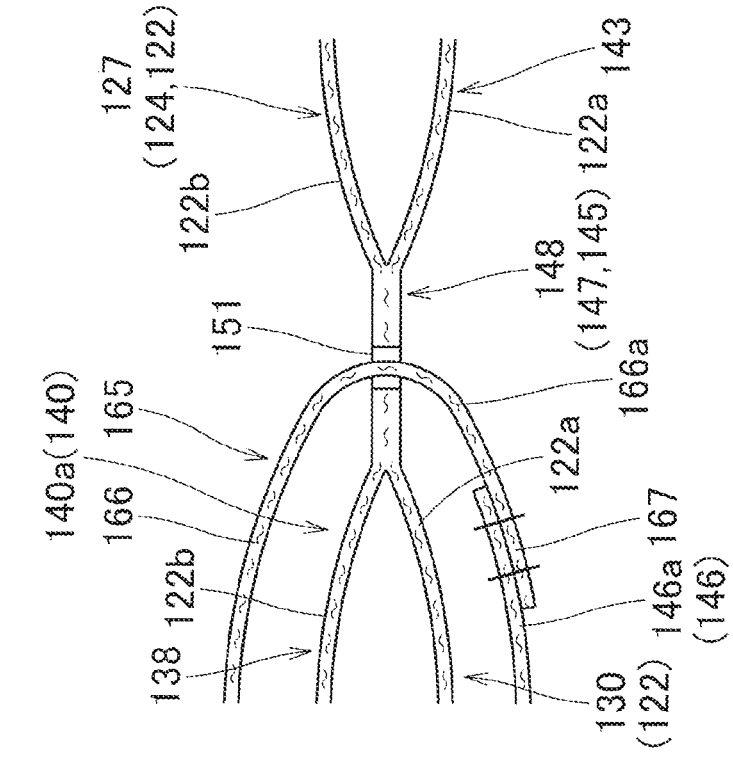

HEAD PROTECTIVE AIRBAG APPARATUS

BACKGROUND OF THE INVENTION

1. Field of the Invention

The present invention relates to a head protective airbag apparatus configured to include an airbag that is folded and stored on a side of an upper edge of a window on a vehicle interior side of a vehicle in which a side of an upper edge of the airbag is attached and fixed to a side of a body of the vehicle, and an inflating gas is caused to flow into the airbag from an inflator such that the airbag is deployed and inflated to cover a vehicle interior side of the window while projecting downward.

2. Description of Related Art

In the related art, as a head protective airbag apparatus, there is a known airbag apparatus having a configuration disclosed in JP-A-2015-85928. In the airbag apparatus in the related art, a tension cloth that is disposed on a side of a front end of a bag main body is wrapped around an end-side inflation portion that is disposed on the side of the front end of the bag main body when inflation is completed. A base side of the tension cloth is joined to a side of a front edge of the end-side inflation portion on the periphery of the end-side inflation portion, and the side of the base portion being inserted into a slit that is disposed on a side of a rear edge of the end-side inflation portion, and a distal end side of the tension cloth is fixed to a side of a body of a vehicle. When the airbag is completely inflated, the end-side inflation portion is disposed to be pushed toward a vehicle interior side by a tension cloth that generates tension in a front-rear direction. Even during an oblique collision, an offset collision, or the like, the end-side inflation portion that is disposed to project toward the vehicle interior side protects the head of an occupant who moves obliquely forward on a vehicle exterior side.

However, the head protective airbag apparatus in the related art has a configuration in which the tension cloth has a strip shape having a wide width such that the end-side inflation portion is pushed toward the vehicle interior side over the substantially entire upper and lower region thereof. Therefore, in a case where a passenger seat airbag or a steering wheel airbag, which is inflated in front of a seat such as a passenger seat, a driver seat, or the like, is disposed to be close to the inflated airbag on the vehicle interior side, a lower side part of the end-side inflation portion interferes with the airbag in some cases when the inflation is completed, and there is room for improvement in suppressing interference with the airbag that is inflated to be close to the apparatus on a vehicle interior side.

SUMMARY OF THE INVENTION

An object of the invention is to provide a head protective airbag apparatus that is capable of suppressing interference with the airbag that is inflated to be close to the apparatus on a vehicle interior side and accurately protecting the head of an occupant even during an oblique collision or an offset collision.

The object of the invention can be achieved by a head protective airbag apparatus having the following configuration.

A head protective airbag apparatus includes: an airbag that is folded and stored on a side of an upper edge of a window on a vehicle interior side of the vehicle in which a side of a upper edge of the airbag is attached and fixed to a side of a body of the vehicle and an inflating gas is caused to flow into an inside of the airbag such that the airbag is deployed and inflated to cover a vehicle interior side of the window while projecting downward; and an inflator that supplies the inflating gas to the airbag. The airbag has a bag main body which is flexible and has a bag shape and of which a side of an upper edge is fixed to the side of the body of the vehicle on the side of the upper edge of the window at a plurality of positions in a front-rear direction, and a connection member which is configured of a flexible sheet material and of which a base side is joined to the bag main body and a distal end side is fixed to a circumferential edge of the window on the side of the body of the vehicle. The bag main body is provided with an end-side inflation portion that is disposed on a side of a front end thereof when inflation is completed, a normal inflation portion that is disposed on a rear side of the end-side inflation portion, and a slit in an intermediate part of the bag main body in an up-down direction between the normal inflation portion and the end-side inflation portion, into which the connection member is insertable. The connection member has a configuration in which the base side thereof is joined to the bag main body which is in a flatly deployed state at a position on a front side from the slit and is disposed to cover a vehicle exterior side of the end-side inflation portion, and a distal end side thereof is fixed to the side of the body of the vehicle at a position on a forward side from the slit in a state in which the connection member is inserted into the slit from the vehicle interior side to the vehicle exterior side. The bag main body is disposed to be pulled by the connection member when the airbag is completely inflated, by joining the base side of the connection member at a position on an upper side from the slit such that a vicinity of a part of the end-side inflation portion, which is joined to the base side of the connection member, has an orientation toward the vehicle interior side.

In the head protective airbag apparatus of the invention, the end-side inflation portion that is disposed on the side of the front end of the bag main body is pulled by the connection member when the airbag is completely inflated, and a region on an upper side, to which the base side of the connection member is joined, is disposed to project toward the vehicle interior side. Since the connection member is inserted into the slit, which is formed in the intermediate part of the bag main body in the up-down direction between the end-side inflation portion and the normal inflation portion, and is disposed such that the distal end side is positioned on the vehicle exterior side of the end-side inflation portion, a lower end side region of the end-side inflation portion (a region on a lower side from the slit) is unlikely to be influenced by the connection member and projection of the region toward the vehicle interior side is suppressed. Therefore, in the head protective airbag apparatus of the invention, the end-side inflation portion is disposed such that only a upper end side region projects toward the vehicle interior side when the airbag is completely inflated. Thus, in a case where a passenger seat airbag or a steering wheel airbag, which is inflated in front of a seat, is disposed to be close to the apparatus on the vehicle interior side, it is possible to suppress interference of a lower end side part of the end-side inflation of the end-side inflation portion with the airbag, and it is possible to dispose the upper end side region of the end-side inflation portion, which projects toward the vehicle interior side, such that the region fills a gap between the window and the airbag which is inflated in front of the seat. As a result, when the head of an occupant moves obliquely forward toward the vehicle exterior side during an oblique collision, an offset collision, or the like, the upper end side region of the end-inflation portion, which projects toward the vehicle interior side, is able to accurately receive the head.

Hence, in the head protective airbag apparatus of the invention, it is possible to suppress the interference with the airbag that is inflated to be close to the apparatus on the vehicle interior side, and thus it is possible to accurately protect the head of the occupant even during the oblique collision or the offset collision.

In addition, in the head protective airbag apparatus of the invention, it is preferable that the airbag is configured to be folded and mounted on the vehicle so as to cause a lower edge thereof to approach the side of the upper edge thereof from a pre-folded state in which the airbag is folded back on the vehicle interior side such that the upper edge side of the end-side inflation portion of the bag main body which is in the flatly deployed state is disposed in the vicinity of the front side of the slit. It is preferable that the connection member has a substantially strip shape, and the slit is formed to be substantially parallel to a width direction of the connection member that is inserted into the slit in a state in which the bag main body is pre-folded.

According to such a configuration of the head protective airbag apparatus, when the bag main body is pre-folded and the airbag is folded, it is possible to suppress generation of wrinkles or the like in the connection member itself or in the vicinity of a part of the slit of the bag main body, into which the connection member is inserted, compared to a case where the slit is disposed to intersect with the width direction of the connection member. Therefore, then, it is possible to easily perform folding that causes a lower edge of the airbag to approach the side of the upper edge thereof, and it is possible to smoothly fold the airbag.

In particular, it is preferable that the head protective airbag apparatus has a configuration in which an exterior-side part of the connection member, which covers the exterior side of the end-side inflation portion, is disposed to be substantially parallel to the front-rear direction in the state in which the bag main body is pre-folded. According to the configuration, when the pre-folded bag main body is folded such that the lower edge thereof approaches the side of the upper edge thereof, it is possible to integrally fold both of the exterior-side part of the connection member, which projects from the slit, and the bag main body around the exterior-side part. Therefore, the connection member is well handled, and thus it is possible to more smoothly fold the airbag.

In addition, a head protective airbag apparatus may have the following configuration.

A head protective airbag apparatus includes: an airbag that is folded and stored on a side of an upper edge of a window on a vehicle interior side of a vehicle in which a side of an upper edge of the airbag is attached and fixed to a side of a body of the vehicle and an inflating gas is caused to flow into an inside of the airbag such that the airbag is deployed and inflated to cover a vehicle interior side of the window while projecting downward; and an inflator that supplies the inflating gas to the airbag. The airbag is configured to be flexible and have a bag shape and a side of an upper edge thereof is fixed to the side of the body of the vehicle on the side of the upper edge of the window at a plurality of positions in a front-rear direction, and the airbag is provided with an end-side inflation portion that is disposed on a side of a front end of the bag main body when inflation is completed and is partitioned from another normal inflation portion by a partition portion that is disposed on a rear side. The end-side inflation portion has a configuration in which an upper part thereof that is disposed on an upper end side when the inflation is completed is disposed to project more toward the vehicle interior side than a lower part that is disposed on a lower end side when the inflation is completed. The upper part is configured to be disposed in a state in which a region from an upper rear side of the partition portion to a lower front side of the partition portion is inflated and is configured to maintain a projection state toward the vehicle interior side when the inflation is completed, by maintaining means. The maintaining means is configured to be capable of maintaining a disposition state in which a vicinity of an upper front end of the end-side inflation portion of the airbag, which is in a flatly deployed state, is displaced toward a lower rear side toward the vehicle interior side.

Also, in the head protective airbag apparatus having the configuration, the end-side inflation portion that is disposed on the front end side of the bag main body is disposed such that an upper part thereof on the upper end side projects more toward the vehicle interior side than the lower part thereof on the lower end side, when the airbag is completely inflated. In addition, the upper part that projects toward the vehicle interior side is configured to be disposed in a state in which the region from the upper rear side of the partition portion to the lower front side of the partition portion is inflated. Therefore, also in the head protective airbag apparatus having the configuration, in a case where a passenger seat airbag or a steering wheel airbag, which is inflated in front of a seat, is disposed to be close to the apparatus on the vehicle interior side, it is possible to suppress interference of the lower part of the end-side inflation portion, which is disposed on the lower end side, with the airbag, and it is possible to dispose the upper part on the upper end side, which projects toward the vehicle interior side, such that the part fills a gap between the window and the airbag which is inflated in front of the seats. As a result, also in the head protective airbag apparatus having the configuration, when the head of the occupant moves obliquely forward toward the exterior side during an oblique collision, an offset collision, or the like, the upper part is able to accurately receive the head. In addition, the upper part is configured to be disposed, in a state in which the region from the upper rear side of the partition portion to the lower front side of the partition portion is inflated, and is configured to maintain the projection state toward the vehicle interior side when the inflation is completed, by maintaining means. Therefore, it is possible to stably maintain the projection state of the upper part toward the vehicle interior side, and the upper part, which is inflated to be wide in the front-rear direction, is able to accurately receive the head of the occupant who moves obliquely forward toward the vehicle exterior side. The maintaining means is capable of maintaining the disposition state in which the vicinity of the upper front end of the end-side inflation portion of the airbag which is in a flatly deployed state is displaced toward the lower rear side toward the vehicle interior side. Specifically, examples of the maintaining means can include a connection belt, which extends from a side of an upper front end of the end-side inflation portion and connects the side of the front end of the airbag to the side of the body by connecting the distal end side thereof to the side of the body in a state in which through the airbag, a joining member that joins the side of the upper front end of the end-side inflation portion directly to a region of the airbag on the lower rear side, and the like.

Hence, also in the head protective airbag apparatus having the configuration, it is possible to suppress the interference with the airbag that is inflated to be close to the apparatus on the vehicle interior side, and thus it is possible to accurately protect the head of the occupant even during the oblique collision or the offset collision.

Specifically, in the head protective airbag apparatus having the configuration, it is preferable that the partition portion is provided with a vertical bar portion that is disposed in an up-down direction so as to form a partition between the end-side inflation portion and the normal inflation portion and a separation portion that is disposed at a position having a height equal to or greater than that of an upper end of the vertical bar portion on a rear side of the vertical bar portion. In the configuration, when the airbag is completely inflated, it is possible to bend the upper part of the end-side inflation portion, which is disposed on the upper end side thereof such that the upper part projects toward the vehicle interior side, from a starting point of bending, which is a part in the vicinity of the separation portion that is disposed at the position having the height equal to or greater than the upper end of the vertical bar portion, and thus it is possible to cause the upper part of the end-side inflation portion on the side of the upper end thereof to smoothly project toward the vehicle interior side. In addition, it is possible to easily set a width dimension of the upper part on a side in the front-rear direction by adjusting the position of the separation portion in the front-rear direction. In particular, it is preferable that the separation portion is disposed above the upper end of the vertical bar portion, because it is possible to stably form the upper part that is configured to gradually increase an amount of projection toward the vehicle interior side toward the upper end side of the vertical bar portion that is disposed on the front side, with a part in the vicinity of the separation portion as a starting point, when the airbag is completely inflated.

In addition, the partition portion may be configured to have a vertical bar portion that is disposed to be substantially parallel to an up-down direction so as to form a partition between the end-side inflation portion and the normal inflation portion and a cross bar portion that extends from the upper end toward the rear side of the vertical bar portion, and a distal end of the cross bar portion may be disposed at a position having a height equal to or greater than that of the upper end of the vertical bar portion. In this case, the cross bar portion may be configured to be continuous from the vertical bar portion or may be configured to be separated from the vertical bar portion. Also, in this case of the configuration, when the airbag is completely inflated, it is possible to bend the upper part of the end-side inflation portion, which is disposed on the upper end side thereof such that the upper part projects toward the vehicle interior side, from a starting point which is a part in the vicinity of the distal end of the cross bar portion which is disposed at the position having the height equal to or greater than the upper end of the vertical bar portion, and thus it is possible to cause the upper part of the end-side inflation portion to smoothly project toward the vehicle interior side. In addition, it is possible to easily set the width dimension of the upper part on the side in the front-rear direction by adjusting the position of the distal end of the cross bar portion in the front-rear direction. In particular, it is preferable that the distal end of the cross bar portion is configured to be disposed above the upper end of the vertical bar portion, because it is possible to stably form the upper part that is configured to gradually increase the amount of projection toward the vehicle interior side toward the side of the upper end of the vertical bar portion that is disposed on the front side, with a part in the vicinity of the distal end of the cross bar portion as a starting point, when the airbag is completely inflated.

Further, the partition portion may be configured to be curved and extend toward an upper rear side from a vicinity of a lower end of the end-side inflation portion. Also, in this case of the configuration, when the airbag is completely inflated, it is possible to bend the upper part of the end-side inflation portion on the upper end side thereof such that the upper part projects toward the vehicle interior side, with a part in the vicinity of the distal end of the partition portion as a starting point, and thus it is possible to cause the upper part to smoothly project toward the vehicle interior side. In addition, it is possible to easily set the width dimension of the upper part on the side in the front-rear direction by adjusting the position of the distal end of the partition portion in the front-rear direction.

BRIEF DESCRIPTION OF THE DRAWINGS

FIG. 3 is a front view illustrating a state in which the bag main body is pre-folded and a connection member is inserted into a slit in the airbag in FIG. 2.

FIGS. 4A and 4B are sectional views schematically illustrating a vicinity of a part of the slit in a state in which the bag main body is pre-folded, and the vicinity of the part of the slit in a state in which the bag main body as a single body is inflated, in the airbag in FIG. 2.

FIG. 5 is a partially enlarged front view illustrating a state in which the bag main body and the connection member are arranged side by side in the airbag in FIG. 2.

FIGS. 12A and 12B are sectional views schematically illustrating a vicinity of a part of the slit in a state in which the bag main body is pre-folded and the vicinity of the part of the slit in a state in which the bag main body as a single body is inflated, in the airbag in FIG. 10.

DESCRIPTION OF THE PREFERRED EMBODIMENTS

Figure 1:
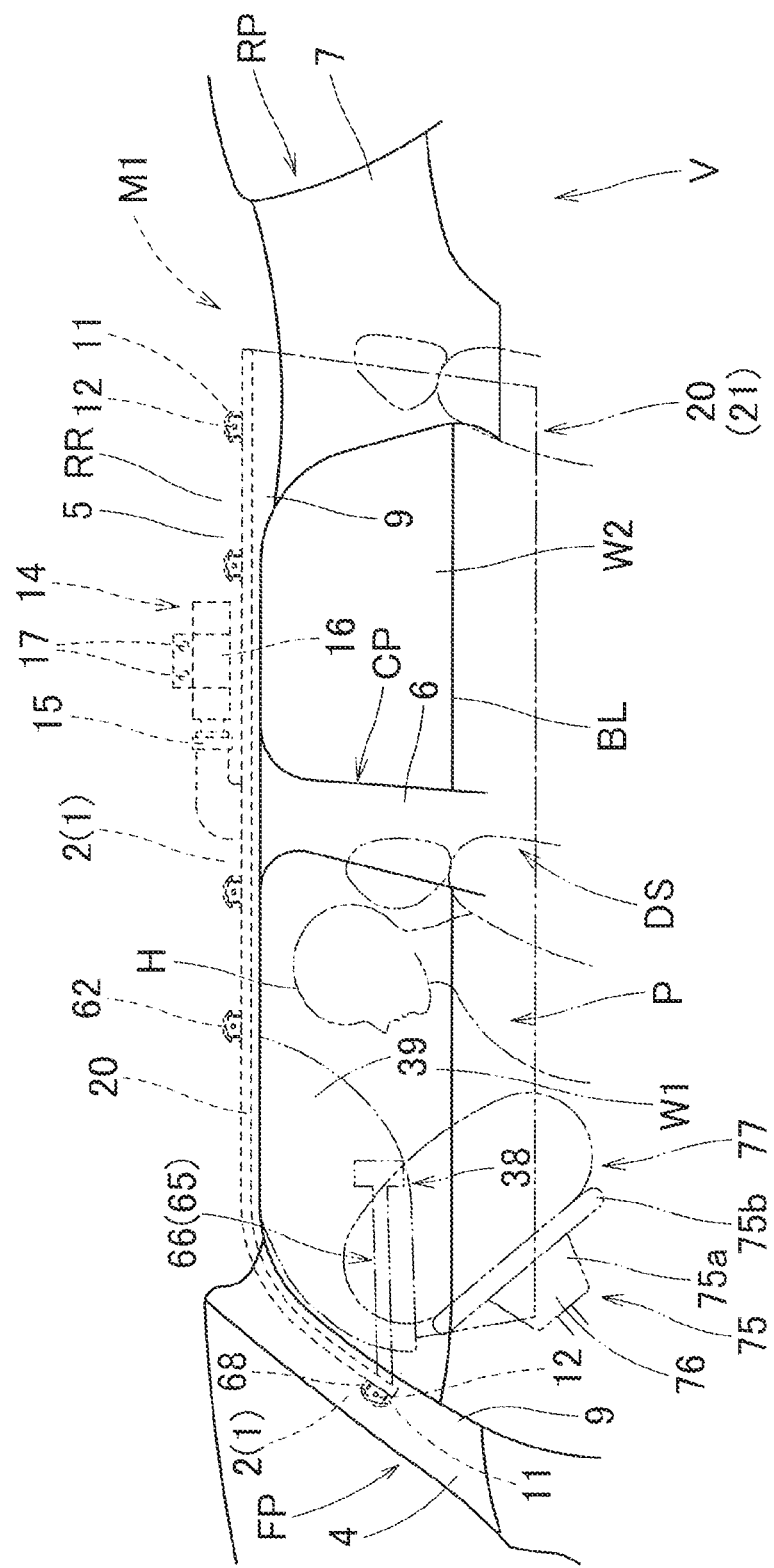
FIG. 1 is a front view schematically illustrating a head protective airbag apparatus in a first embodiment of the invention when viewed from a vehicle interior side.

Hereinafter, embodiments of the invention will be described with reference to the figures. As illustrated in FIG. 1, a head protective airbag apparatus M1 of a first embodiment is mounted on a two-row seat type vehicle V having two windows (side windows) W1 and W2. In the embodiment, the head protective airbag apparatus M1 that is mounted on a side of an upper edge of the windows W1 and W2 on a right side (exterior side O) of a driver seat DS in a right hand drive vehicle is described. As illustrated in FIG. 1, the head protective airbag apparatus M1 of the embodiment includes an airbag 20, an inflator 14, attachment brackets 11 and 16, and an airbag cover 9. As illustrated in FIG. 1, the airbag 20 is folded and stored on the side of the upper edge of the windows W1 and W2 on a vehicle interior side of the vehicle V from a side of a lower edge of a front pillar FP through a side of a lower edge of a roof side rail RR to a region above a rear pillar RP.

Figure 8:
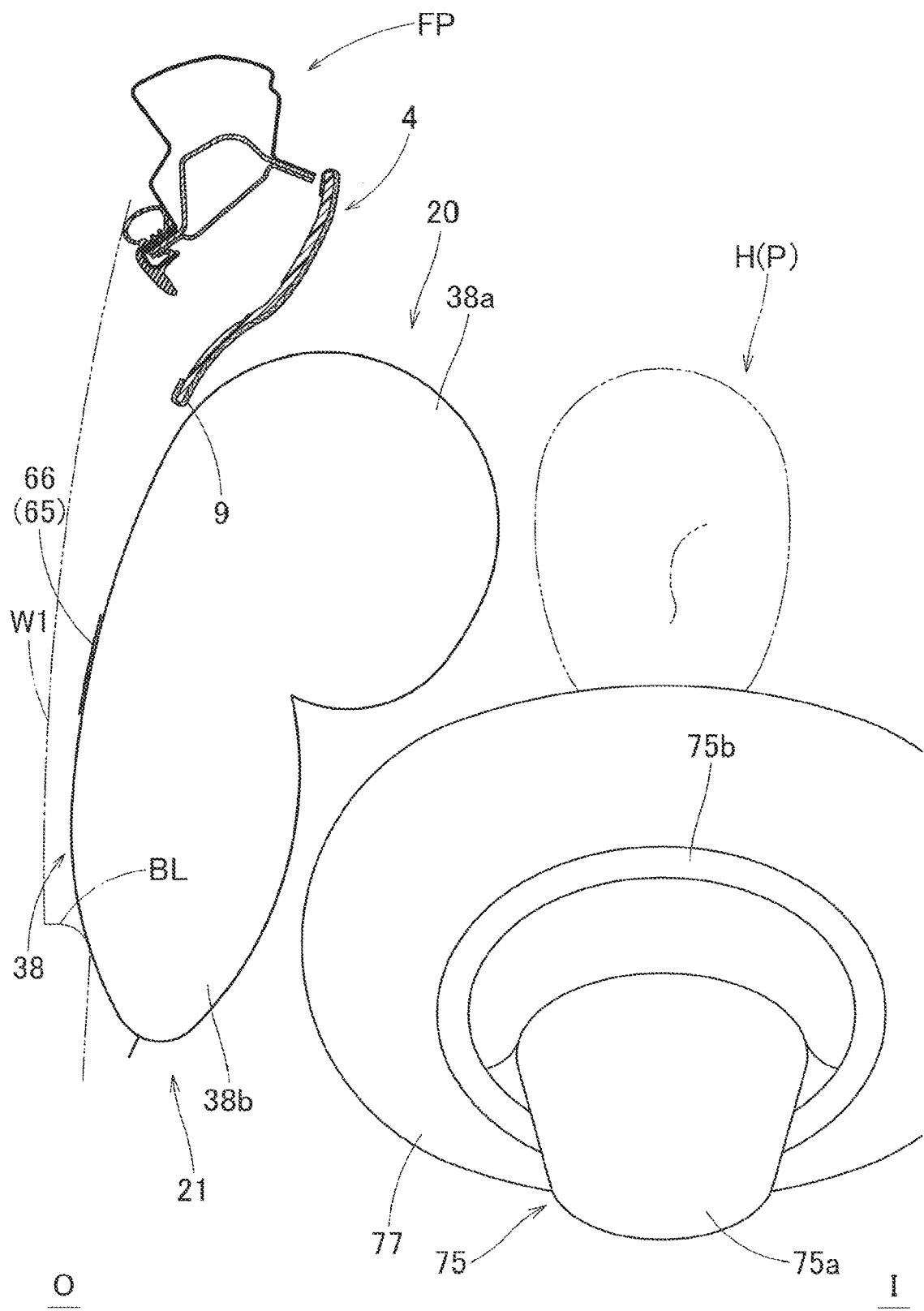
FIG. 8 is a partially enlarged sectional view taken along an up-down direction, schematically illustrating the state in which the airbag is completely inflated in the head protective airbag apparatus of the first embodiment.
Figure 9:
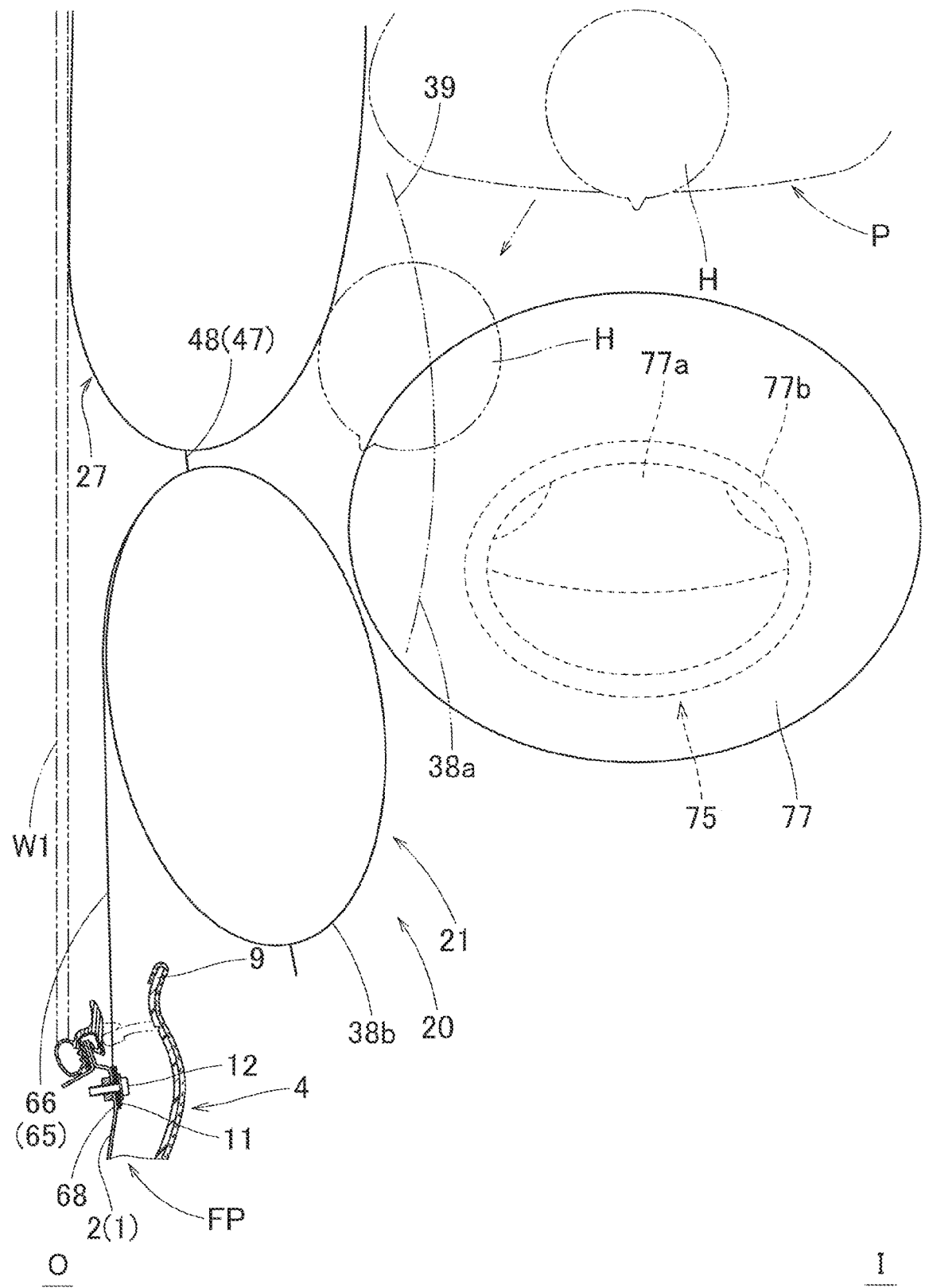
FIG. 9 is a partially enlarged sectional view taken along a front-rear direction, schematically illustrating the state in which the airbag is completely inflated in the head protective airbag apparatus of the first embodiment.

As illustrated in FIGS. 1, 8, and 9, the airbag cover 9 is formed from lower edges of a front pillar garnish 4 that is disposed in the front pillar FP and a roof head lining 5 that is disposed in the roof side rail RR. The front pillar garnish 4 and the roof head lining 5 are both made of a synthetic resin and are attached and fixed to a vehicle interior side I on an inner panel 2 of a body 1 (vehicle body) in the front pillar FP and the roof side rail RR, respectively. In addition, the airbag cover 9 covers a vehicle interior side of the airbag 20, which is folded and stored, and to be pushed by the airbag 20 so as to be openable toward the vehicle interior side I in order for the airbag 20 to be projectable downward toward the vehicle interior side during deployment and inflation (refer to FIGS. 8 and 9).

The inflator 14 supplies an inflating gas to the airbag 20 and is a substantially columnar cylinder type inflator, as illustrated in FIG. 1. The inflator 14 is provided with a gas discharge port (not illustrated), through which the inflating gas can be discharged, on a distal end side of the inflator. The inflator 14 is connected to the airbag 20 by inserting the distal end side including the gas discharge port into a connection port portion 26 (to be described below) of the airbag 20, by using a clamp 15 that is disposed on an outer circumference side of the connection port portion 26. In addition, the inflator 14 is attached at a position of the inner panel 2, which is disposed above the window W2, by using the attachment bracket 16, which holds the inflator 14, and bolts 17 for fixing the attachment bracket 16 to the inner panel 2 on the side of the body 1 (refer to FIG. 1). The inflator 14 is electrically connected to a control device (not illustrated) of the vehicle V via a lead wire (not illustrated). When the control device detects a side collision, an oblique collision, an offset collision, rollover, or the like, the inflator 14 is actuated by an input of an actuation signal from the control device.

Figure 7:
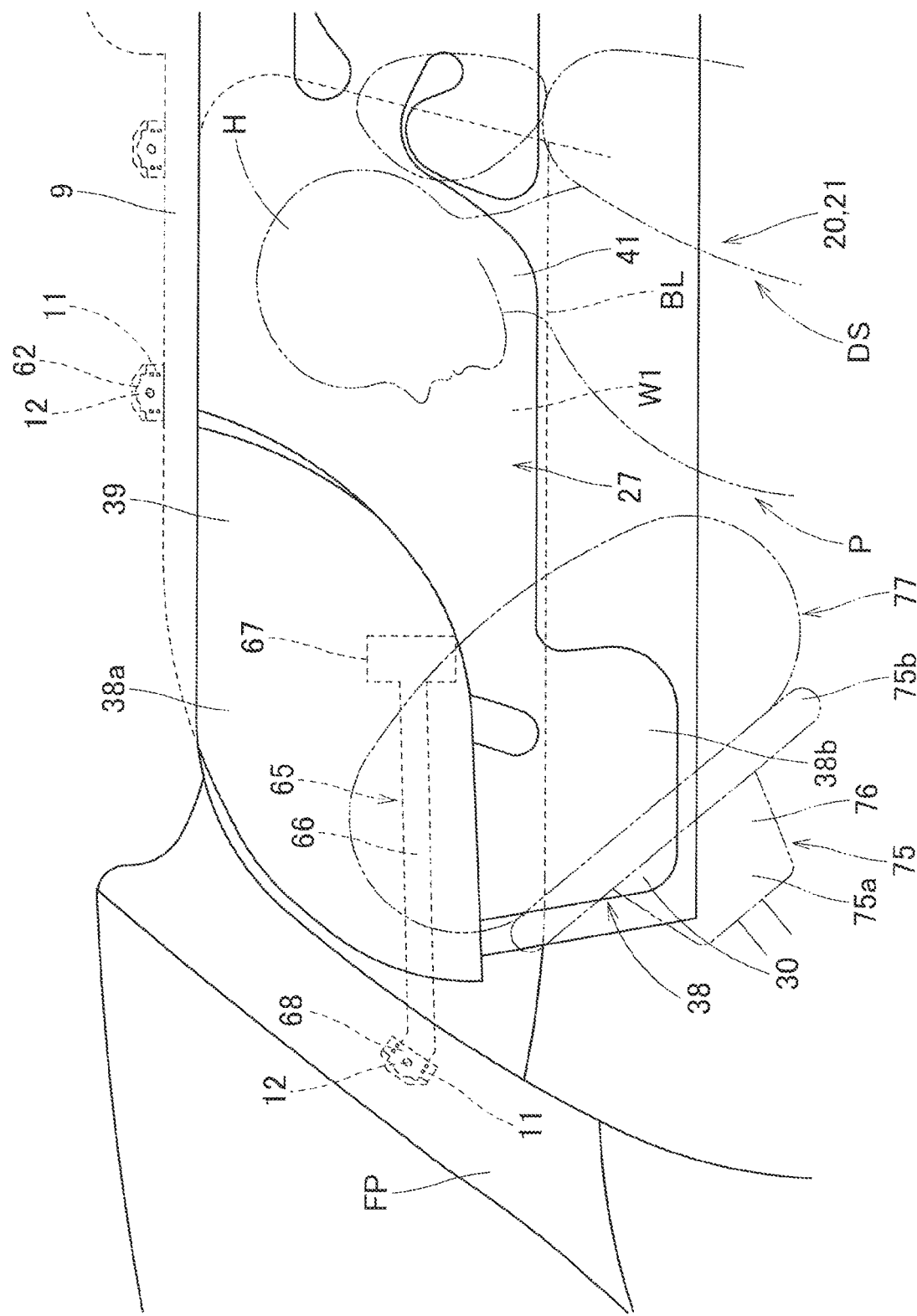
FIG. 7 is a partially enlarged front view illustrating the state in which the airbag is completely inflated, when viewed from the vehicle interior side, in the head protective airbag apparatus of the first embodiment.

The attachment brackets 11 are each configured of two metal-sheet plates. The attachment brackets 11 are attached to attachment portions 62 and 68 (to be described below) of the airbag 20, respectively, with the attachment portions 62 and 68 sandwiched from front and back, and the attachment portions 62 and 68 are attached and fixed to the inner panel 2 on the side of the body 1 by using bolts 12 (refer to FIGS. 1, 7, and 9).

As illustrated in FIGS. 2 to 5, the airbag 20 has a bag main body 21 and a connection member 65 that extends from a front end side of the bag main body 21.

Figure 6:
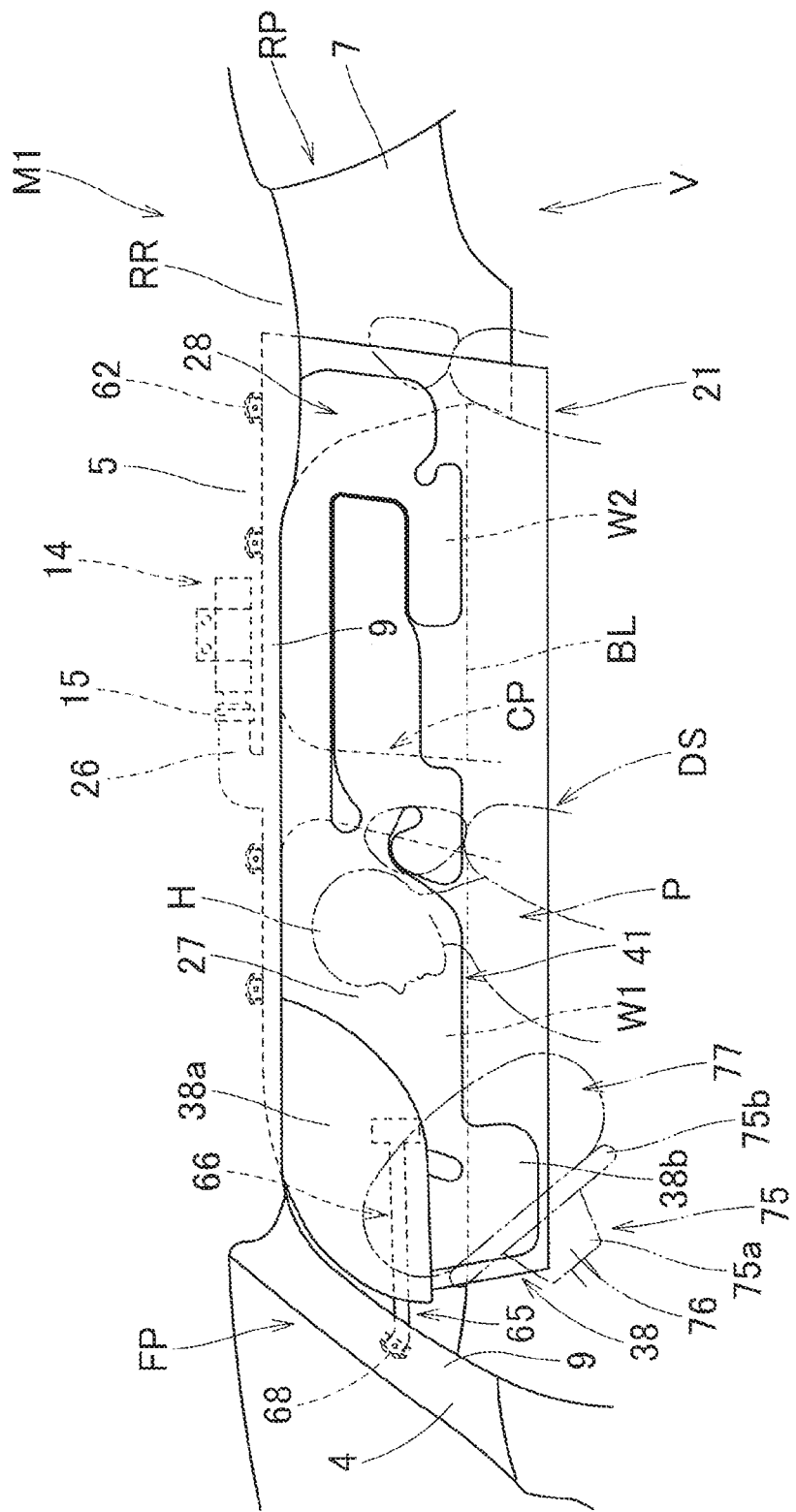
FIG. 6 is a front view schematically illustrating a state in which the airbag is completely inflated, when viewed from the vehicle interior side, in the head protective airbag apparatus of the first embodiment.

As illustrated by a two-dot chain line in FIG. 1 and in FIG. 6, the bag main body 21 is configured to be flexible, have a bag shape, cause the inflating gas to flow into an inside thereof from the inflator 14, be deployed from a folded state, and cover the vehicle interior side I of the windows W1 and W2 and the pillar garnishes 6 and 7 of a center pillar CP and the rear pillar RP. The bag main body 21 has a substantially rectangular plate-shaped external shape with a longitudinal direction that is substantially parallel to the front-rear direction such that the bag main body can cover the vehicle interior side from the window W1 through the center pillar CP and the window W2 to a front side of the rear pillar RP when the inflation is completed (refer to FIG. 2). In addition, in a case of the embodiment, as illustrated in FIG. 6, the bag main body 21 has a width dimension set in its vertical direction such that a lower edge 21b is positioned below a belt line BL configured from lower edges of the windows W1 and W2 when the inflation is completed.

Figure 2:
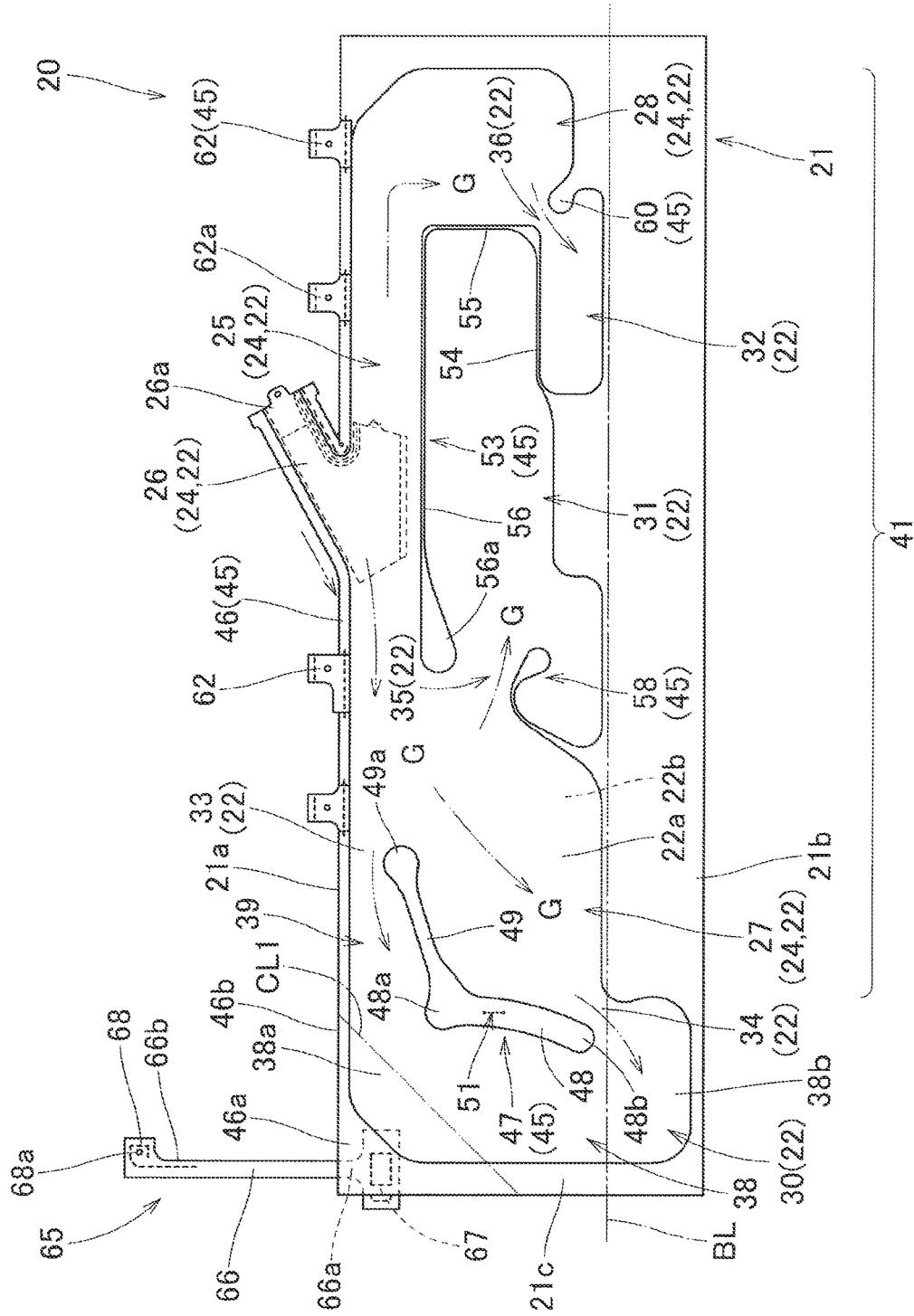
FIG. 2 is a front view illustrating a state in which a bag main body is flatly deployed in an airbag that is used in the head protective airbag apparatus of the first embodiment.

In the case of the embodiment, the bag main body 21 is manufactured through bag weaving using a polyamide yarn, a polyester yarn, or the like. As illustrated in FIG. 2, the bag main body 21 is provided with an inflation portion 22, which is inflated by causing the inflating gas to flow into an inside thereof such that a vehicle interior-side wall portion 22a that is positioned on the vehicle interior side I is separated from a vehicle exterior-side wall portion 22b that is positioned on the vehicle exterior side O when the inflation is completed, and a non-inflation portion (closed portion) 45, which is formed by joining the vehicle interior-side wall portion 22a to the vehicle exterior-side wall portion 22b and into which the inflating gas does not flow.

In the case of the embodiment, the inflation portion 22 is configured to be able to protect the head of an occupant even during rollover of a vehicle V. The inflation portion 22 is provided with a main inflation portion 24 (primary inflation portion), which is inflated by causing the inflating gas that is discharged from the inflator 14 to flow thereinto, and a front auxiliary inflation portion 30, a center auxiliary inflation portion 31, and a rear auxiliary inflation portion 32 (secondary inflation portions) which communicate with the main inflation portion 24 and of which inflation is completed after the main inflation portion 24 is completely inflated. In addition, the inflation portion 22 is also provided with communication portions 33, 34, 35, and 36 through which the main inflation portion 24 communicates with the front auxiliary inflation portion 30, the center auxiliary inflation portion 31, and the rear auxiliary inflation portion 32, respectively. In the case of the embodiment, as illustrated in FIG. 2, the bag main body 21 is configured to be inflated by causing an inflating gas G to flow into the inside thereof substantially all across the entire region thereof except for small regions of an end-side partition portion 47, normal partition portions 53 and 58, and a thickness regulating portion 60 (to be described below) which form partitions between the main inflation portion 24, the front auxiliary inflation portion 30, the center auxiliary inflation portion 31, and the rear auxiliary inflation portion 32.

The main inflation portion 24 is provided with a gas guiding channel 25, the connection port portion 26, a front protective portion 27, and a rear protective portion 28.

The gas guiding channel 25 is provided along the substantially entire region from front to rear of the main inflation portion 24 in a front-rear direction thereof so as to extend to be substantially parallel to the front-rear direction on an upper edge 21a side of the bag main body 21. The gas guiding channel 25 is used to guide the inflating gas G, which is discharged from the inflator 14, to the front protective portion 27 and the rear protective portion 28 which are disposed below the gas guiding channel 25. In the case of the embodiment, substantially at the center from front to rear of the gas guiding channel 25 (a position slightly to a rear side from the center of the bag main body 21), the connection port portion 26 that is connected to the inflator 14 is provided to communicate with the gas guiding channel 25 such that the connection port portion projects upward from the gas guiding channel 25. In the case of the embodiment, the connection port portion 26 is formed obliquely toward an upper rear side with respect to the gas guiding channel 25, and a rear end side 26a of the connection port portion is open to enable the inflator 14 to be inserted thereinto. The connection port portion 26 is connected to the inflator 14 by fitting the clamp 15 on an outer circumferential side in a state in which the inflator 14 is inserted into an inside of the connection port portion. The airbag 20 of the embodiment has a separate inner tube (without a reference sign in figures) for increasing heat resistance which is formed in a part from the connection port portion 26 to a portion of the gas guiding channel 25 directly under the connection port portion 26 (refer to FIG. 2).

The front protective portion 27 is disposed on a side of a front seat (driver seat DS) when the inflation is completed. The front protective portion 27 is used to protect a head H of an occupant P (driver) who is seated on the front seat (driver seat DS) when the airbag 20 is completely inflated during a side collision. The rear protective portion 28 is disposed on a side of a rear seat when the inflation is completed. The rear protective portion 28 is used to protect the head of the occupant who is seated on the rear seat when the airbag 20 is completely inflated during the side collision.

The front auxiliary inflation portion 30 is disposed on a side of a front end 21c of the bag main body 21 so as to be adjacent to the front side of the main inflation portion 24 (the front protective portion 27). In the bag main body 21 of the embodiment, the front auxiliary inflation portion 30 that is disposed on the side of the front end 21c constitutes an end-side inflation portion 38. In the case of the embodiment, the front auxiliary inflation portion 30 has a substantially bar-shaped inflation completed shape formed to be substantially parallel to the up-down direction and the end-side partition portion 47 forms a partition from the front protective portion 27 adjacent thereto on the rear side. In the case of the embodiment, the front auxiliary inflation portion 30 extends far below the belt line BL when the inflation is completed. A lower end of the front auxiliary inflation portion 30 is positioned below the front protective portion 27. In addition, the front auxiliary inflation portion 30 communicates with the front protective portion 27 through the communication portion 33 that is open on an upper rear end side of the front auxiliary inflation portion and the communication portion 34 that is open on a lower rear end side thereof. The communication portions 33 and 34 have a configuration in which an opening width dimension thereof is set to be small and a start of inflow of the inflating gas into the front auxiliary inflation portion 30 is more delayed than inflow into the front protective portion 27.

In the case of the embodiment, the center auxiliary inflation portion 31 is disposed in a region below the gas guiding channel 25, between the front protective portion 27 and the rear protective portion 28 in the main inflation portion 24. In addition, the center auxiliary inflation portion 31 is disposed to be adjacent to the front protective portion 27 in the main inflation portion 24. The center auxiliary inflation portion 31 communicates with the front protective portion 27 through the communication portion 35 that is open on a rear end side of the front protective portion 27. The communication portion 35 also has a configuration in which an opening width dimension thereof is set to be small and a start of inflow of the inflating gas into the center auxiliary inflation portion 31 is more delayed than inflow into the front protective portion 27. The rear auxiliary inflation portion 32 is disposed in a region on a side of a lower rear edge of the center auxiliary inflation portion 31, in front of the rear protective portion 28. In addition, the rear auxiliary inflation portion 32 is disposed to be adjacent to the rear protective portion 28 in the main inflation portion 24. The rear auxiliary inflation portion 32 communicates with the rear protective portion 28 through the communication portion 36 that is open on a side of a lower front end of the rear protective portion 28. The communication portions 36 also has a configuration in which an opening width dimension thereof is set to be small and a start of inflow of the inflating gas into the rear auxiliary inflation portion 32 is delayed more than inflow into the rear protective portion 28.

In the bag main body 21 of the embodiment, the front auxiliary inflation portion 30 constitutes the end-side inflation portion 38 that is disposed on the front end 21c side of the bag main body 21, and a part of the inflation portion 22 other than the end-side inflation portion 38 (the front auxiliary inflation portion 30) constitutes a normal inflation portion 41. The end-side partition portion 47 forms a partition between the end-side inflation portion 38 and the front protective portion 27 that constitutes the normal inflation portion 41. The end-side partition portion 47 is formed by being separated from a circumferential edge portion 46. In addition, the end-side partition portion 47 has a vertical bar portion 48 that is disposed to be substantially parallel to the up-down direction and a cross bar portion 49 that is disposed to be substantially parallel to the front-rear direction so as to extend rearward from an upper end 48a of the vertical bar portion 48. To be more specific, the cross bar portion 49 is formed to be inclined toward an upper rear side with respect to the front-rear direction such that a distal end (rear end 49a) thereof is positioned on an upper side. A side of an upper end 38a of the end-side inflation portion 38 communicates with the front protective portion 27 via the communication portion 33 which is formed between the distal end (rear end 49a) of the cross bar portion 49 and the circumferential edge portion 46. A side of a lower end 38b of the end-side inflation portion 38 communicates with the front protective portion 27 via the communication portion 34 which is formed between a lower end 48b of the vertical bar portion 48 and the circumferential edge portion 46. In other words, in the embodiment, a region of the inflation portion 22 on the upper side of the cross bar portion 49 constitutes the end-side inflation portion 38, and the end-side inflation portion 38 is provided with a projection portion 39 that projects rearward on the side of the upper end 38a in a flatly deployed state. In addition, the end-side inflation portion 38 is disposed in a state in which the side of the lower end 38b projects downward far below the belt line BL when the airbag 20 is completely inflated (refer to FIGS. 6 to 8). Further, in a state in which a steering wheel airbag 77, which is mounted on a steering wheel 75 in front of the driver seat DS, is completely inflated, the end-side inflation portion 38 is inflated such that a part thereof on the side of the lower end 38b and the steering wheel airbag 77 overlap each other on a side in a left-right direction (in a vehicle interior-exterior direction) (refer to FIGS. 6, 7, and 9).

The end-side inflation portion 38 is disposed such that the end-side inflation portion is pulled by the connection member 65 and the upper end 38a side of the end-side inflation portion 38 is oriented toward the vehicle interior side I (projects toward the vehicle interior side I), when the airbag 20 is completely inflated while mounted on the vehicle (refer to FIGS. 8 and 9). Specifically, in the end-side inflation portion 38, a region above a slit 51 which is formed in the vertical bar portion 48 of the end-side partition portion 47 is bent with respect to a part on the side of the lower end 38b with a part in the vicinity of a rear end of the projection portion 39 (a part of the communication portion 33) as a starting point. This region of the end-side inflation portion 38, which is bent, includes the projection portion 39. A region of the end-side inflation portion above the slit 51 is disposed to project toward the vehicle interior side I.

The non-inflation portion (closed portion) 45 is provided with the circumferential edge portion 46, which constitutes an outer circumference edge of the inflation portion 22, the end-side partition portion 47, the normal partition portions 53 and 58, and the thickness regulating portion 60 which are disposed in the region of the inflation portion 22, and the attachment portions 62 for attaching the side of the upper edge 21a of the bag main body 21 to the side of the body 1 of the vehicle V.

The circumferential edge portion 46 is disposed to surround the entire periphery of the inflation portion 22 except for the side of the rear end 26a of the connection port portion 26.

The end-side partition portion 47 forms a partition between the front auxiliary inflation portion 30 and the front protective portion 27 (the end-side inflation portion 38 and the normal inflation portion 41). In the case of the embodiment, both upper and lower end sides of the end-side partition portion 47 are separated from the circumferential edge portion 46. Similar to the description above, the end-side partition portion 47 has the vertical bar portion 48 that is disposed to be substantially parallel to the up-down direction and the cross bar portion 49 that is disposed to be substantially parallel to the front-rear direction so as to extend rearward from the upper end 48a of the vertical bar portion 48. In the case of the embodiment, the vertical bar portion 48 is configured to be slightly inclined with respect to the up-down direction such that a lower end 48b thereof is positioned slightly to a front side from the upper end 48a thereof. To be more specific, the cross bar portion 49 is configured to be inclined toward the upper rear side with respect to the front-rear direction such that the distal end (rear end 49a) thereof is positioned on the upper side. The rear end 49a of the cross bar portion 49 projects upward far above an upper cross bar portion 56 of the normal partition portion 53. In the case of the embodiment, the slit 51 into which the connection member 65 is insertable is formed in the vertical bar portion 48 of the end-side partition portion 47, which is between the normal inflation portion 41 and the end-side inflation portion 38. The slit 51 is formed in the vertical bar portion 48, in an intermediate part of the bag main body 21 in the up-down direction. To be more specific, the slit 51 is formed in a state in which a cut that is substantially parallel to the up-down direction is made at a position slightly to an upper side from the center of the bag main body 21 in its vertical direction. A length dimension of the slit 51 is set to the extent that only a main body portion 66 of the connection member 65 is insertable into the slit and a joining piece 67 on a side of a base portion 66a of the main body portion 66 is not insertable thereinto. The slit 51 is formed to be substantially parallel to a width direction of the main body portion 66 of the connection member 65 that is inserted into the slit 51 in a state in which the bag main body 21 is pre-folded as will be described below.

The normal partition portions 53 and 58 are disposed in a region of the normal inflation portion 41 and partition the normal inflation portion 41 into the gas guiding channel 25, the front protective portion 27, the rear protective portion 28, the center auxiliary inflation portion 31, and the rear auxiliary inflation portion 32. To be more specific, the normal partition portion 53 is provided with a lower cross bar portion 54, a vertical bar portion 55, and the upper cross bar portion 56. The lower cross bar portion 54 extends rearward from a part of the circumferential edge portion 46 on the side of the lower edge so as to be parallel to the front-rear direction and forms a partition between the center auxiliary inflation portion 31 and the rear auxiliary inflation portion 32. The vertical bar portion 55 extends upward from a rear end of the lower cross bar portion 54 so as to be parallel to the up-down direction and forms a partition between the center auxiliary inflation portion 31 and the rear protective portion 28. The upper cross bar portion 56 extends forward from an upper end of the vertical bar portion 55 so as to be parallel to the front-rear direction and forms a partition between the gas guiding channel 25 and the center auxiliary inflation portion 31. The normal partition portion 58 extends from the part of the circumferential edge portion 46 on the side of the lower edge toward an upper rear side and is bent such that a distal end of the normal partition portion is oriented downward, in a region below a front end 56a of the upper cross bar portion 56. The normal partition portion 58 partitions a region of the front protective portion 27 and the center auxiliary inflation portion 31 on the side of the lower edge.

The thickness regulating portion 60 is formed to project upward from the side of the lower edge of the circumferential edge portion 46, in the vicinity of a boundary part between the rear auxiliary inflation portion 32 and the rear protective portion 28. In the airbag 20 of the embodiment, a gap between the rear end 49a of the cross bar portion 49 of the end-side partition portion 47 and the side of the upper edge of the circumferential edge portion 46 constitutes the communication portion 33. A gap between the lower end 48b of the vertical bar portion 48 of the end-side partition portion 47 and the side of the lower edge of the circumferential edge portion 46 constitutes the communication portion 34. A gap between the front end 56a of the upper cross bar portion 56 of the normal partition portion 53 and the normal partition portion 58 constitutes the communication portion 35. A gap between the rear end of the lower cross bar portion 54 of the normal partition portion 53 and the thickness regulating portion 60 constitutes the communication portion 36.

The attachment portions 62 are provided at a plurality of positions on the side of the upper edge 21a of the bag main body 21 in the front-rear direction, and four attachment portions 62 are formed in the case of the embodiment. The attachment portion 62 is fixed to the inner panel 2 on the side of the body 1 in a part of the roof side rail RR, by using the attachment bracket 11 and the attachment bolt 12. Specifically, the attachment portion 62 is not disposed in the region of the end-side inflation portion 38 (the front auxiliary inflation portion 30) so as not to interfere with the projection of the upper end 38a on the vehicle interior side, when the airbag 20 is completely inflated. In other words, in the airbag 20 of the embodiment, the attachment portions 62 are provided in a region on a rear side from the rear end 49a of the cross bar portion 49 of the end-side partition portion 47. The attachment portion 62 is provided with an attachment hole 62a into which the attachment bolt 12 is inserted.

The connection member 65 is configured of a flexible sheet material, and the connection member is formed of a woven fabric made of a polyamide yarn, a polyester yarn, or the like in the case of the embodiment. A base side of the connection member 65 is joined to the bag main body 21, and a distal end side thereof is fixed to the side of the body 1 of the vehicle V on a circumferential edge of the window W1. When the airbag 20 is completely inflated, the connection member 65 is disposed to be substantially parallel to the front-rear direction on the exterior side O of the end-side inflation portion 38. The connection member 65 is provided with the strip-shaped main body portion 66 that is inserted into the slit 51, the joining piece 67 that is formed on base portion 66a side of the main body portion 66 and is joined to the side of the bag main body 21, and an attachment portion 68 that is formed on a distal end 66b side of the main body portion 66. The joining piece 67 is formed to have a width wider than the main body portion 66 and to project upward and downward from the main body portion 66. In other words, the joining piece 67 is configured to have a width wider than the slit 51 and not to be insertable into the slit 51. Similar to the attachment portion 62 that is formed on the bag main body 21, the attachment portion 68 is fixed to the inner panel 2 on the side of the body 1 in the part of the front pillar FP which is the circumferential edge of the window W1 by using the attachment bracket 11 and the attachment bolt 12, and the attachment portion 68 is provided with an attachment hole 68a into which the attachment bolt 12 is insertable.

As illustrated in FIG. 2, in a state in which the bag main body 21 is flatly deployed, the connection member 65 is disposed to be substantially parallel to the up-down direction such that the joining piece 67 is sewed (joined) to an upper front corner 46a of the circumferential edge portion 46 (a front edge side of the upper end of the end-side inflation portion 38) in the bag main body 21, and the main body portion 66 extends upward from the joining piece 67. To be more specific, the joining piece 67 is placed on the vehicle exterior side O (the vehicle exterior-side wall portion 22b side) of the bag main body 21. In other words, the joining piece 67 on the base portion 66a side of the main body portion 66 of the connection member 65 is joined at a position on a front side and an upper side from the slit 51 in the bag main body 21 which is in the flatly deployed state. As illustrated in FIGS. 3 and 4A, the connection member 65 is folded together with the bag main body 21, in which a side of an upper front edge of the bag main body 21 is folded back toward the vehicle interior side, in a state in which the main body portion 66 is inserted into the slit 51 from the vehicle interior side I to the vehicle exterior side O and is disposed to cover the vehicle exterior side O of the end-side inflation portion 38. At this time, as illustrated in FIG. 2, the bag main body 21 is pre-folded to be folded back such that a region of the upper front edge side of the end-side inflation portion 38 is placed on the vehicle interior-side wall portion 22a side on a folding-back line CL1 that is inclined toward an upper rear side. The upper edge side of the end-side inflation portion 38 (an upper edge 46b of the circumferential edge portion 46) is disposed in the vicinity of the front side of the slit 51 (refer to FIG. 4A). To be more specific, when the end-side inflation portion 38 is folded back (when the bag main body 21 is pre-folded), the upper edge 46b of the circumferential edge portion 46 is disposed to be substantially parallel to the up-down direction substantially along the slit 51 at a position that is substantially coincident with the slit 51 (refer to FIG. 3). In addition, at this time, as illustrated in FIG. 4A, the connection member 65 itself is disposed in a state in which the joining piece 67 is exposed on the vehicle interior side I, the base side of the main body portion 66 in the vicinity of the joining piece 67 is inserted into the slit 51 and is reversed, and a part of the main body portion 66, which is disposed on the vehicle exterior side O of the end-side inflation portion 38, is oriented to be substantially parallel to the front-rear direction such that the attachment portion 68 is oriented forward. As described above, the slit 51 is formed to be substantially parallel to the up-down direction so as to be substantially parallel to the width direction of the main body portion 66 of the connection member 65 that is disposed to be substantially parallel to the front-rear direction when pre-folding is performed. A length dimension of the connection member 65 (a length dimension of the main body portion 66) is set to a dimension by which the upper end 38a side of the end-side inflation portion 38, including the projection portion 39, can be pulled so as to project toward the vehicle interior side when the bag main body 21 is completely inflated while mounted on the vehicle. To be more specific, a length dimension of the connection member 65 (the main body portion 66) is set to a dimension by which the region on the side of the front edge of the upper end 38a side of the end-side inflation portion 38, to which the joining piece 67 is joined, can be brought into press contact with a surface on the vehicle interior side of the lower end 38b side of the end-side inflation portion 38 while tension is generated substantially along the main body portion 66 when the bag main body 21 is completely inflated.

When the bag main body 21 is completely inflated, the connection member 65 is disposed such that a part of the main body portion 66, which is disposed on the vehicle exterior side of the end-side inflation portion 38, is oriented to be substantially parallel to the front-rear direction while the side of the upper end 38a of the end-side inflation portion 38 projects toward the vehicle interior side. In the bag main body 21 of the embodiment, the end-side partition portion 47, which forms the partition between the end-side inflation portion 38 and the normal inflation portion 41, is provided with the cross bar portion 49 that extends from the upper end 48a of the vertical bar portion 48 toward an upper rear side. The side of the rear end 49a of the cross bar portion 49 has the smallest separation length from the circumferential edge portion 46, that is, has the narrowest width. Therefore, when the inflation is completed, the end-side inflation portion 38 is disposed to be folded from a starting point which is the vicinity of the rear end 49a of the cross bar portion 49 (the vicinity of the communication portion 33, that is, the vicinity of the rear end of the projection portion 39 of the end-side inflation portion 38), which is a rear side from a folding-back line CL1 obtained at the time of folding and storing such that the part of the upper end 38a side, including the projection portion 39, projects toward the vehicle interior side. The joining piece 67 on the base side of the connection member 65 is joined to the circumferential edge portion 46 that constitutes the non-inflation portion 45 in the bag main body 21. When the bag main body 21 is completely inflated, the upper front corner 46a of the circumferential edge portion 46, to which the joining piece 67 is joined, is bent with respect to the end-side inflation portion 38 due to the tension generated along the main body portion 66 and is disposed by being folded in on the vehicle exterior side O of the end-side inflation portion 38 (refer to FIG. 4B). In other words, the vehicle interior side of the joining piece 67 on the base side of the connection member 65 is also covered with the part on the upper end 48a side of the end-side inflation portion 38 (refer to FIG. 7), and the connection member 65 is disposed to have a linear shape that is substantially parallel to the front-rear direction when viewed from in the up-down direction side (refer to FIGS. 4B and 9). At this time, the end-side inflation portion 38 is disposed to have a large chamber shape in one room by removing a crease of the folding-back line CL1 at the time of the folding and storing (at the time of pre-folding) in a state in which an inflation region is disposed on the vehicle interior side while the upper edge 46b of the circumferential edge portion 46, which constitutes the side of the upper edge, is reversed and the part on the side of the upper end 38a projects toward the vehicle interior side.

In addition, a steering wheel airbag apparatus 76, which is actuated when an impact force from the front side of the vehicle V is applied, is mounted on the steering wheel 75 that is disposed in front of the driver seat DS in the vehicle V on which the head protective airbag apparatus M of the embodiment is mounted (refer to FIG. 1). The airbag apparatus 76 includes the airbag 77, which is folded and stored in a boss portion 75a of the steering wheel 75, and an inflator (not illustrated) that supplies the inflating gas to the airbag 77. The airbag 77 causes the inflating gas to flow into the inside thereof and is inflated to cover all across the entire surface on the side of the upper surface of a ring portion 75b of the steering wheel 75 when the impact force from the front side, including the oblique collision or the offset collision, is applied (refer to a two-dot chain line in FIGS. 6 and 7 and in FIGS. 8 and 9).

Next, mounting of the head protective airbag apparatus M1 of the first embodiment on the vehicle V will be described. First, the bag main body 21, which is obtained in a state in which the vehicle interior-side wall portion 22a and the vehicle exterior-side wall portion 22b are flatly deployed, is pre-folded to be folded back, as illustrated in FIG. 3, such that the region on the side of the upper front edge of the end-side inflation portion 38 is placed on the side of the vehicle interior-side wall portion 22a in the part of the folding-back line CL1 (refer to FIG. 2) while the main body portion 66 of the connection member 65 is inserted into the slit 51. Then, while the pre-folded state is maintained, the bag main body 21 is folded such that the lower edge 21b side approaches the upper edge 21a side, and thereby the airbag 20 is folded. In the embodiment, although not illustrated in detail, the bag main body 21 is folded by folding the part of the gas guiding channel 25, which is the side of the upper edge 21a, into a bellows shape with a plurality of creases added in the front-rear direction, and a region below the gas guiding channel 25 is folded into a roll such that the region is wound from the lower edge 21b side toward the vehicle exterior side. After the airbag 20 is completely folded, predetermined positions of the folded airbag 20 are wrapped by an unfolding preventive wrapping material (not illustrated), which can be broken.

Then, the inflator 14, on which the attachment bracket 16 has been attached, is connected to the connection port portion 26 of the airbag 20 by using the clamp 15. The attachment brackets 11 are fixed to both of an attachment portion 69 of the connection member 65 and the attachment portions 62 of the bag main body 21, and an airbag assembly is formed.

Subsequently, the attachment brackets 11 and 16 are disposed at predetermined positions on the inner panel 2 on the side of the body 1 and are screwed with the bolts 12 and 17. A lead wire (not illustrated) extending from a predetermined control device for actuating the inflator is connected to the inflator 14. The front pillar garnish 4 and the roof head lining 5 are attached to the inner panel 2 on the side of the body 1. Further, when the pillar garnishes 6 and 7 are attached to the inner panel 2 on the side of the body 1, it is possible to mount the head protective airbag apparatus M on the vehicle V.

After the head protective airbag apparatus M1 of the first embodiment is mounted on the vehicle V, the inflating gas that is discharged from the inflator 14 flows into the bag main body 21 when the inflator 14 is actuated by receiving an actuation signal from the control device during the side collision, the oblique collision, the offset collision, or the rollover of the vehicle. The bag main body 21, which is inflated, breaks the wrapping material (not illustrated), pushes and opens the airbag cover 9, which is configured from the lower edges of the front pillar garnish 4 and the roof head lining 5, and is significantly inflated to cover the vehicle interior side of the windows W1 and W2, the center pillar CP, and the rear pillar RP while projecting downward, as illustrated by a two-dot chain line in FIG. 1 and in FIGS. 6 and 7. In addition, the steering wheel airbag apparatus 76, which is mounted on the steering wheel 75 in front of the driver seat DS, is also actuated such that the airbag 77 is inflated as illustrated by two-dot chain lines in FIGS. 1, 6, and 7 and in FIGS. 8 and 9, during the oblique collision or the offset collision. In the embodiment, since the bag main body 21 is folded by being folded into a roll so as to be wound from the lower edge 21b side toward the vehicle exterior side, the main body portion 66 of the connection member 65 is disposed in a distorted state when the bag main body 21 is completely inflated, although not illustrated in detail.

In the head protective airbag apparatus M1 of the first embodiment, the end-side inflation portion 38 that is disposed on the front end 21c side of the bag main body 21 is pulled by the connection member 65 when the airbag 20 is completely inflated, and a region on an upper side, to which the base portion 66a of the connection member 65 is joined, is disposed to project toward the vehicle interior side I. Since the connection member 65 is inserted into the slit 51, which is formed in the intermediate part of the bag main body 21 in the up-down direction between the end-side inflation portion 38 and the normal inflation portion 41, and is disposed such that the distal end 66b side is positioned on the vehicle exterior side O of the end-side inflation portion 38, a region of the lower end 38b of the end-side inflation portion 38 (the region on a lower side from the slit 51) is unlikely to be influenced by the connection member 65 and projection of the region toward the vehicle interior side I is suppressed. Therefore, in the head protective airbag apparatus M of the embodiment, the end-side inflation portion 38 is disposed such that only the region of the upper end 38a side projects toward the vehicle interior side I when the airbag 20 is completely inflated. Hence, even when the steering wheel airbag 77, which is inflated in front of the driver seat DS (seat) is disposed to be close to the apparatus on the vehicle interior side as illustrated in FIGS. 8 and 9, it is possible to suppress interference of the part of the lower end 38b side of the end-side inflation portion with the airbag 77, and it is possible to dispose the region of the upper end 38a side, which projects toward the vehicle interior side I, such that the region fills the gap between the window W1 and the airbag 77 which is inflated in front of the driver seat DS. As a result, when the head H of a driver P who is the occupant moves obliquely forward toward the vehicle exterior side during the oblique collision, the offset collision, or the like, the part of the upper end 38a of the end-side inflation portion 38, which projects toward the vehicle interior side I, is able to accurately receive the head H.

Hence, in the head protective airbag apparatus M1 of the first embodiment, it is possible to suppress the interference with the airbag 77 that is closely inflated to the vehicle interior side, and thus it is possible to accurately protect the head H of the occupant P even during the oblique collision or the offset collision.

In addition, in the head protective airbag apparatus M1 of the first embodiment, the airbag 20 is folded and mounted on the vehicle V so as to cause the lower edge 21b thereof approaches the upper edge 21a side in which the airbag is folded back toward the vehicle interior side, to approach the upper edge side of the end-side inflation portion 38 (the upper edge 46b of the circumferential edge portion 46) being positioned in the vicinity of the front side of the slit 51 from the state in which the bag main body 21 is flatly deployed. The connection member 65 has the substantially strip-shaped main body portion 66, and the slit 51 is formed to be substantially parallel to the width direction of the main body portion 66 of the connection member 65 that is inserted into the slit 51 in a state in which the bag main body 21 is pre-folded. Therefore, when the bag main body 21 is pre-folded and the airbag 20 is folded, it is possible to suppress generation of wrinkles or the like in the connection member 65 itself or in the vicinity of the part of the slit 51 of the bag main body 21 (a part around the end-side partition portion 47), into which the main body portion 66 of the connection member 65 is inserted, compared to a case where the slit is disposed to intersect with the width direction of the connection member. As a result, then, it is possible to easily perform folding that causes the lower edge 21b to approach the upper edge 21a side, and it is possible to smoothly fold the airbag 20. If such a point described above is not considered, the slit may be formed to intersect with the width direction of the connection member in a state in which the bag main body is pre-folded.

In particular, in the head protective airbag apparatus M1 of the first embodiment, the main body portion 66 of the connection member 65, which covers the vehicle exterior side of the end-side inflation portion 38, is disposed to be substantially parallel to the front-rear direction in the state in which the bag main body 21 is pre-folded. Therefore, when the pre-folded bag main body 21 is folded such that the lower edge 21b approaches the upper edge 21a side, it is possible to integrally fold both of the main body portion 66 of the connection member 65, which projects from the slit 51, and the bag main body 21 around the main body portion, and thus the connection member 65 is well handled. As a result, it is possible to more smoothly fold the airbag 20. If such a point described above is not considered, the main body portion of the connection member may be configured to be disposed and inclined with respect to the front-rear direction when the bag main body is pre-folded.

In the head protective airbag apparatus M1 of the first embodiment, the connection member 65 is joined to the bag main body 21 in a state in which the joining piece 67 on the base portion 66a side is placed on the vehicle exterior side O of the bag main body 21 (the side of the vehicle exterior-side wall portion 22b) on the front edge side of the upper end of the end-side inflation portion 38. However, the joining position of the base portion side of the connection member to the bag main body is not limited to that in the embodiment, and a configuration in which the base portion side is placed on the vehicle interior side of the bag main body may be employed. In addition, a configuration in which the base portion side of the connection member is joined to the upper edge side of the end-side inflation portion may be employed.

Further, in the head protective airbag apparatus M1 of the first embodiment, the slit 51, into which the connection member 65 is inserted, in the bag main body 21 is disposed at the position slightly to the upper side from the substantial center of the bag main body 21 in its vertical direction. However, the position of the slit in the up-down direction can be appropriately set depending on an interior shape of the vehicle. When the slit is disposed on a lower side, it is possible to increase the region of the end-side inflation portion, which projects toward the vehicle interior side when the inflation is completed. Conversely, when the slit is disposed on an upper side, it is possible to prevent the lower side part of the end-side inflation portion from projecting toward the vehicle interior side, and it is possible to accurately regulate interference with the airbag that is inflated to be close to the apparatus on the vehicle interior side.

In addition, in the head protective airbag apparatus M1 of the first embodiment, the slit 51, into which the connection member 65 is inserted, is formed in the vertical bar portion 48 of the end-side partition portion 47 that forms the partition between the normal inflation portion 41 and the end-side inflation portion 38. However, a shape of the partition portion (closed portion) which is provided with the slit is not limited to that in the embodiment. For example, a configuration in which a circular partition portion (closed portion) or a partition portion (closed portion), which is intermittently formed in the up-down direction, is formed between the normal inflation portion and the end-side inflation portion and such a closed portion is provided with the slit may be employed.

In the head protective airbag apparatus M1 of the first embodiment, the end-side partition portion 47, which forms the partition between the end-side inflation portion 38 and the normal inflation portion 41, is provided with the cross bar portion 49 that projects from the upper end 48a side of the vertical bar portion 48 toward the upper rear side. The end-side inflation portion 38 is provided with the projection portion 39 on the upper end 38a side, and the projection portion 39 projects rearward in a state in which the bag main body 21 is flatly deployed. In other words, when the airbag 20 is completely inflated, the end-side inflation portion 38 is disposed such that the upper end 38a side projects toward the vehicle interior side in an area including the projection portion 39 which is wide in its front-rear direction (refer to FIGS. 6 and 9). Therefore, during the oblique collision, the offset collision, or the like, the upper end 38a side part of the end-side inflation portion 38, which is inflated in the wide area, can accurately restrict the head H of the occupant P which moves obliquely forward toward the vehicle exterior side. It is needless to say that the shape of the end-side inflation portion is not limited to that in the embodiment. The end-side inflation portion may have a substantially constant width dimension on the side in the front-rear direction over the entire region in its vertical direction. Further, in the head protective airbag apparatus M1 of the first embodiment, the end-side inflation portion 38 is disposed in a state in which the lower end 38b side is positioned downward far below the belt line BL when the inflation is completed. Therefore, when the upper end 38a side part receives the head H of the occupant P which moves obliquely forward toward the vehicle exterior side, the lower end 38b side is supported by a member such as a door trim that is disposed to project more toward the vehicle interior side than the window W1 below the belt line BL, and it is possible to more accurately restrict the head H of the occupant P.

Next, a head protective airbag apparatus M2 of a second embodiment of the invention will be described. Similar to the head protective airbag apparatus M1 described above, the head protective airbag apparatus M2 is mounted on a two-row seat type vehicle V having two windows (side windows) W1 and W2. The head protective airbag apparatus M2 has the same configuration as that of the head protective airbag apparatus M1 of the first embodiment except for an airbag 120, the same reference signs are assigned to the same members, and the detailed description thereof is omitted.

As illustrated in FIGS. 10 to 13, the airbag 120 that is used in the head protective airbag apparatus M2 of the second embodiment has a bag main body 121 and a connection belt 165 that extends from the front end 121c side of the bag main body 121.

Figure 14:
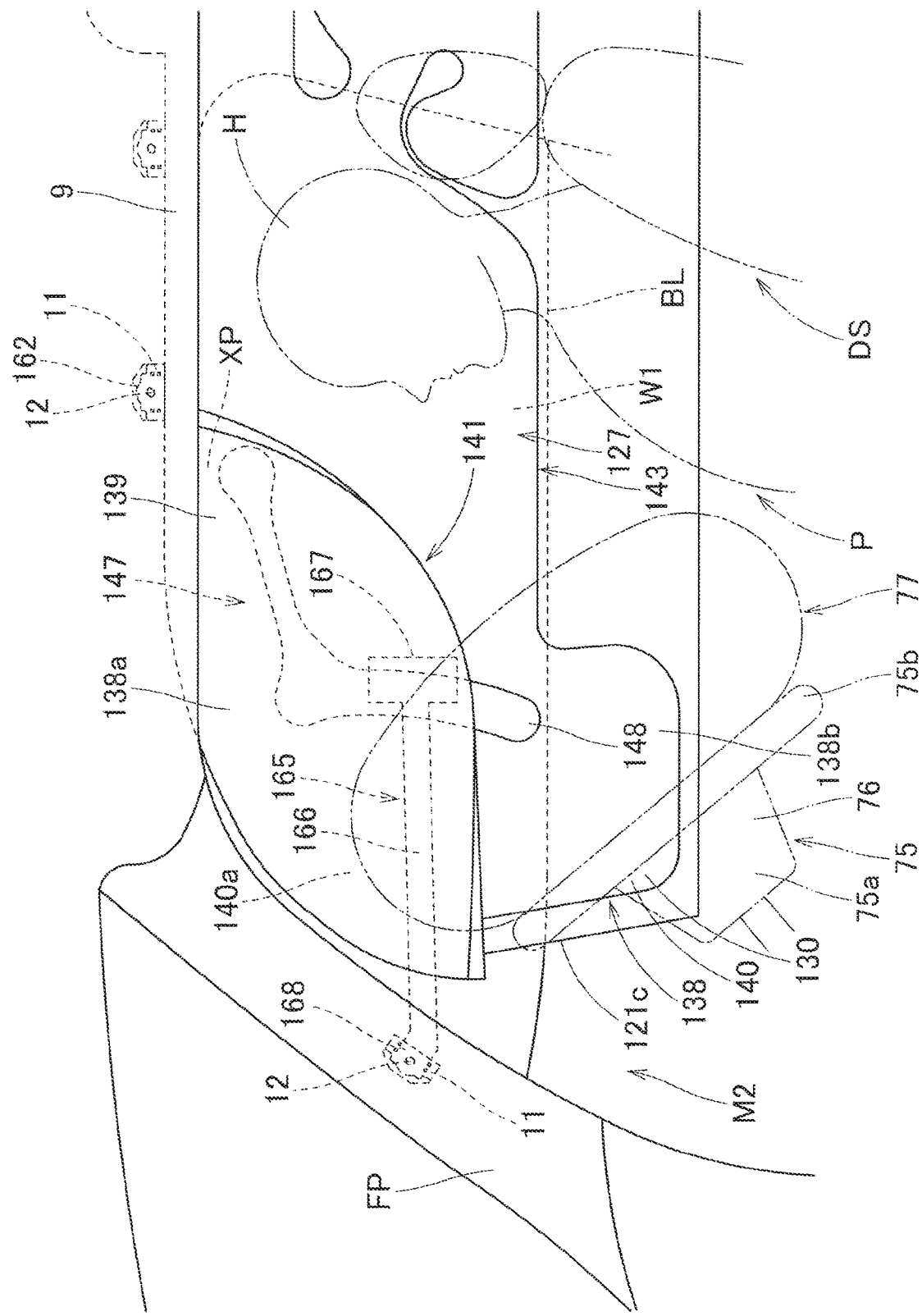
FIG. 14 is a partially enlarged front view illustrating the state in which the airbag is completely inflated, when viewed from the vehicle interior side, in the head protective airbag apparatus of the second embodiment.

The bag main body 121 is configured to be flexible, have a bag shape, cause the inflating gas to flow into an inside thereof from the inflator 14, be deployed from a folded state, and cover the vehicle interior side I of the windows W1 and W2 or the pillar garnishes 6 and 7 of the center pillar CP and the rear pillar RP. The bag main body 121 has a substantially rectangular plate-shaped external shape with a longitudinal direction that is substantially parallel to the front-rear direction such that the bag main body can cover the vehicle interior side from the window W1 through the center pillar CP and the window W2 to a front side of the rear pillar RP when the inflation is completed (refer to FIG. 10). In addition, in a case of the embodiment, as illustrated in FIG. 14, the bag main body 121 has a width dimension set in its vertical direction such that the lower edge 121b is positioned below the belt line BL configured from lower edges of the windows W1 and W2 when the inflation is completed.

Figure 10:
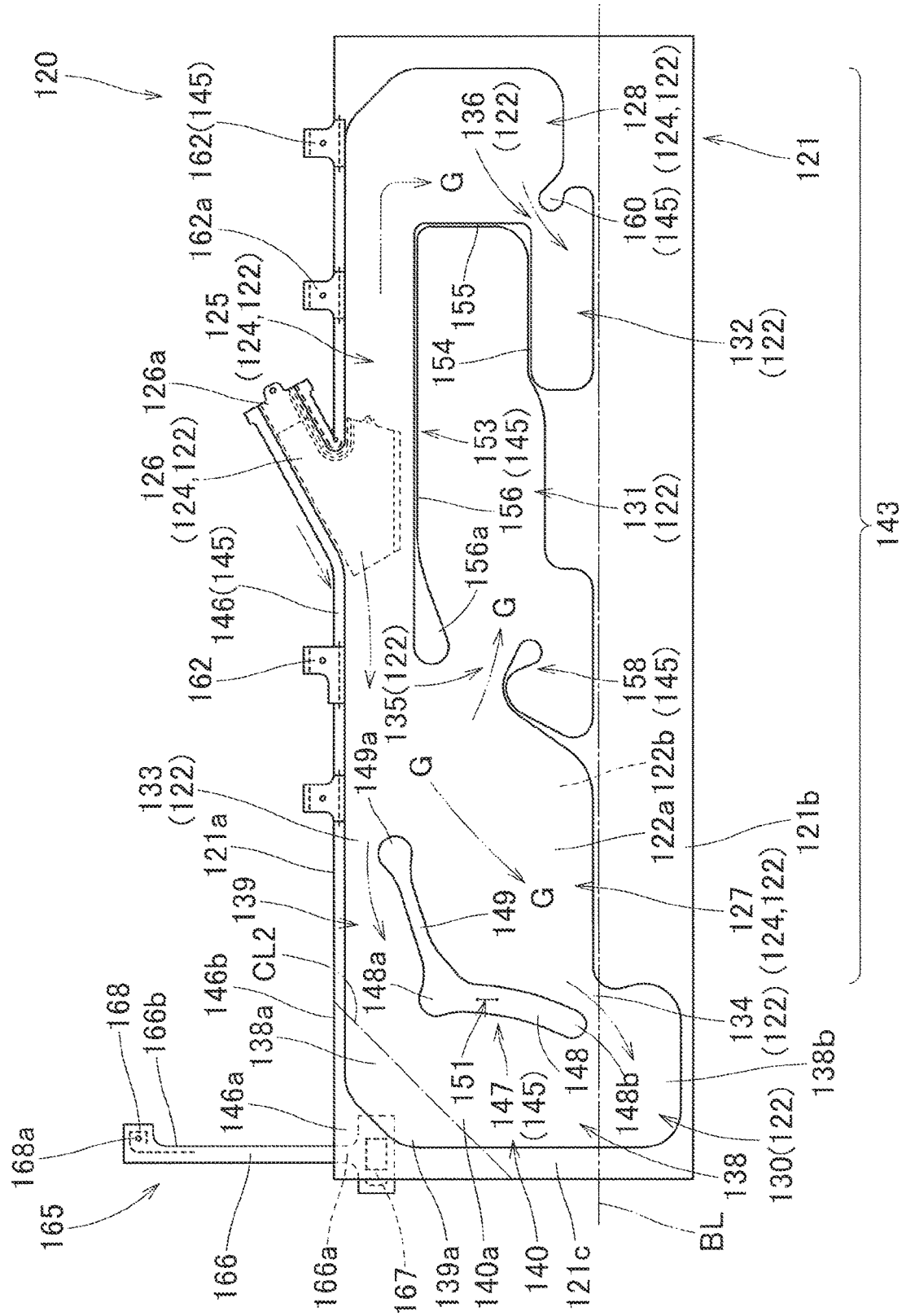
FIG. 10 is a front view illustrating a state in which a bag main body is flatly deployed in an airbag that is used in a head protective airbag apparatus of a second embodiment.

In the case of the embodiment, the bag main body 121 is manufactured through bag weaving using a polyamide yarn, a polyester yarn, or the like. As illustrated in FIG. 10, the bag main body 121 is provided with an inflation portion 122, which is inflated by causing the inflating gas to flow into an inside thereof such that a vehicle interior-side wall portion 122a that is positioned on the vehicle interior side I is separated from a vehicle exterior-side wall portion 122b that is positioned on the vehicle exterior side O when the inflation is completed, and a non-inflation portion 145, which is configured by joining the vehicle interior-side wall portion 122a to the vehicle exterior-side wall portion 122b and into which the inflating gas does not flow.

In the case of the embodiment, the inflation portion 121 is configured to be able to protect the head of the occupant even during rollover of a vehicle V. The inflation portion 122 is provided with a main inflation portion 124 (primary inflation portion), which is inflated by causing the inflating gas that is discharged from the inflator 14 to flow thereinto, and a front auxiliary inflation portion 130, a center auxiliary inflation portion 131, and a rear auxiliary inflation portion 132 (secondary inflation portions) which communicate with the main inflation portion 124 and of which inflation is completed after the main inflation portion 124 is completely inflated. The inflation portion 122 is also provided with communication portions 133, 134, 135, and 136 through which the main inflation portion 124 communicates with the front auxiliary inflation portion 130, the center auxiliary inflation portion 131, and the rear auxiliary inflation portion 132, respectively. In the case of the embodiment, as illustrated in FIG. 10, the bag main body 121 is configured to be inflated by causing an inflating gas G to flow into the inside thereof substantially all across the entire region thereof except for small regions of an end-side partition portion 147, normal partition portions 153 and 158, and a thickness regulating portion 160 which form partitions between the main inflation portion 124, the front auxiliary inflation portion 130, the center auxiliary inflation portion 131, and the rear auxiliary inflation portion 132.

The main inflation portion 124 is provided with a gas guiding channel 125, the connection port portion 126, a front protective portion 127, and a rear protective portion 128.

The gas guiding channel 125 is disposed along the substantially entire region from front to rear of the main inflation portion 124 in a front-rear direction thereof so as to extend to be substantially parallel to the front-rear direction on an upper edge 121a side of the bag main body 121. The gas guiding channel 125 is used to guide the inflating gas G, which is discharged from the inflator 14, to the front protective portion 127 and the rear protective portion 128 which are disposed below the gas guiding channel 125. Substantially, at the center from front to rear of the gas guiding channel 125 (a position slightly to a rear side from the center of the bag main body 121), the connection port portion 126 that is connected to the inflator 14 is provided to communicate with the gas guiding channel 125 such that the connection port portion projects upward from the gas guiding channel 125. In the case of the embodiment, the connection port portion 126 is formed obliquely toward an upper rear side with respect to the gas guiding channel 125, and a rear end 126a side of the connection port portion 126 is open to enable the inflator 14 to be inserted thereinto. The airbag 120 of the embodiment also has an inner tube (without a reference sign in figures) in a part from the connection port portion 126 to a part of the gas guiding channel 125 directly under the connection port portion 126 (refer to FIG. 10).

The front protective portion 127 is disposed on a side of a front seat (driver seat DS) when the inflation is completed. The front protective portion 127 is used to protect the head H of the occupant P (driver) who is seated on the front seat (driver seat DS) when the airbag 120 is completely inflated during the side collision. The rear protective portion 128 is disposed on a side of a rear seat when the inflation is completed. The rear protective portion 128 is used to protect the head of the occupant who is seated on the rear seat when the airbag 120 is completely inflated during the side collision.

The front auxiliary inflation portion 130 is disposed on a side of a front end 121c of the bag main body 121 so as to be adjacent to the front side of the main inflation portion 124 (the front protective portion 127). In the airbag 120 (the bag main body 121) of the embodiment, the front auxiliary inflation portion 130 that is disposed on the side of the front end 121c constitutes an end-side inflation portion 138. The front auxiliary inflation portion 130 has a substantially bar-shaped inflation completed shape formed to be substantially parallel to the up-down direction and the end-side partition portion 147 (to be described below), which is disposed on a rear side, forms the partition from the front protective portion 127 adjacent thereto on the rear side. In the case of the embodiment, the front auxiliary inflation portion 130 extends far below the belt line BL when the inflation is completed. A lower end of the front auxiliary inflation portion 130 is positioned below the front protective portion 127. In addition, the front auxiliary inflation portion 130 communicates with the front protective portion 127 through the communication portion 133 that is open on an upper rear end side of the front auxiliary inflation portion 130 and the communication portion 134 that is open on a lower rear end side thereof. The communication portions 133 and 134 have a configuration in which an opening width dimension thereof is set to be small and a start of inflow of the inflating gas into the front auxiliary inflation portion 130 is more delayed than inflow into the front protective portion 127.

In the case of the embodiment, the center auxiliary inflation portion 131 is disposed in a region below the gas guiding channel 125, between the front protective portion 127 and the rear protective portion 128 in the main inflation portion 124. The center auxiliary inflation portion 131 is disposed to be adjacent to the front protective portion 127 in the main inflation portion 124. The center auxiliary inflation portion 131 communicates with the front protective portion 127 through the communication portion 135 that is open on a rear end side of the front protective portion 127. The communication portion 135 also has a configuration in which an opening width dimension thereof is set to be small and a start of inflow of the inflating gas into the center auxiliary inflation portion 131 is more delayed than inflow into the front protective portion 127. The rear auxiliary inflation portion 132 is disposed in a region on a side of a lower rear edge of the center auxiliary inflation portion 131, on a front end side of the rear protective portion 128. The rear auxiliary inflation portion 132 is disposed to be adjacent to the rear protective portion 128 in the main inflation portion 124. The rear auxiliary inflation portion 132 communicates with the rear protective portion 128 through the communication portion 136 that is open on a side of a lower front end of the rear protective portion 128. The communication portion 136 also has a configuration in which an opening width dimension thereof is set to be small and a start of inflow of the inflating gas into the rear auxiliary inflation portion 132 is more delayed than inflow into the rear protective portion 128.

In the bag main body 121 of the embodiment, the front auxiliary inflation portion 130 constitutes the end-side inflation portion 138 that is disposed on the front end 121c side of the bag main body 121, and a part of the inflation portion 122 other than the end-side inflation portion 138 (the front auxiliary inflation portion 130) constitutes a normal inflation portion 143. The end-side partition portion 147 forms the partition between the end-side inflation portion 138 and the front protective portion 127 that constitutes the normal inflation portion 143. The end-side partition portion 147 is formed by being separated from a circumferential edge portion 146. The end-side partition portion 147 has a vertical bar portion 148 that is disposed to be substantially parallel to an up-down direction so as to form the partition between the end-side inflation portion 138 and the normal inflation portion 143 and a cross bar portion 149 that extends from an upper end 148a of the vertical bar portion 148 toward an upper rear side. A side of an upper end 138a of the end-side inflation portion 138 communicate with the front protective portion 127 via the communication portion 133 which is formed between the distal end (rear end 149a) of the cross bar portion 149 and the circumferential edge portion 146. A side of a lower end 138b of the end-side inflation portion 138 communicates with the front protective portion 127 via the communication portion 134 which is formed between a lower end 148b of the vertical bar portion 148 and the circumferential edge portion 146.

To be more specific, the end-side inflation portion 138 is provided with an upper part 139 and a lower part 140. The upper part 139 is disposed on the upper end 138a side and is configured from a region above the end-side partition portion 147. The lower part 140 is disposed on the lower end 138b side and is configured from a front side region of the end-side partition portion 147 of the vertical bar portion 148. The upper part 139 is configured to have a wide width in its front-rear direction, compared to the lower part 140. In the embodiment, the upper part 139 is configured to be pulled by the connection belt 165 as maintaining means when the bag main body 121 is completely inflated and to project and be disposed on the vehicle interior side I from the lower part 140. To be more specific, the end-side inflation portion 138 is provided with the vehicle interior-side projection portion 141 configured such that the upper part 139 and an upper region 140a in the lower part 140 (a region that is disposed on the front side of the vertical bar portion 148) are overlapped each other in a vehicle interior-exterior direction on the upper end 138a side when the inflation is completed. When the bag main body 121 is completely inflated, the upper part 139, which is disposed to project toward the vehicle interior side I, is disposed in a region extending from the vertical bar portion 148 in its front-rear direction. In other words, the upper part 139 (the vehicle interior-side projection portion 141) is disposed, in a state to inflate the area from rear-upper of the vertical bar portion 148 to the front-lower of the vertical bar portion 148, when the bag main body 121 is completely inflated (refer to FIG. 14). In addition, the vehicle interior-side projection portion 141 is formed above the slit 151 (to be described below) which is formed in the vertical bar portion 148. Specifically, the upper part 139 is disposed to project toward the vehicle interior side I such that a region of the end-side inflation portion 138 above the slit 151 constitutes the vehicle interior-side projection portion 141 in a state in which the upper part is bent with respect to the lower part 140 with a part in the vicinity of the rear end thereof (a part of the communication portion 133) as a starting point XP, when the bag main body 121 is completely inflated.

Figure 13:
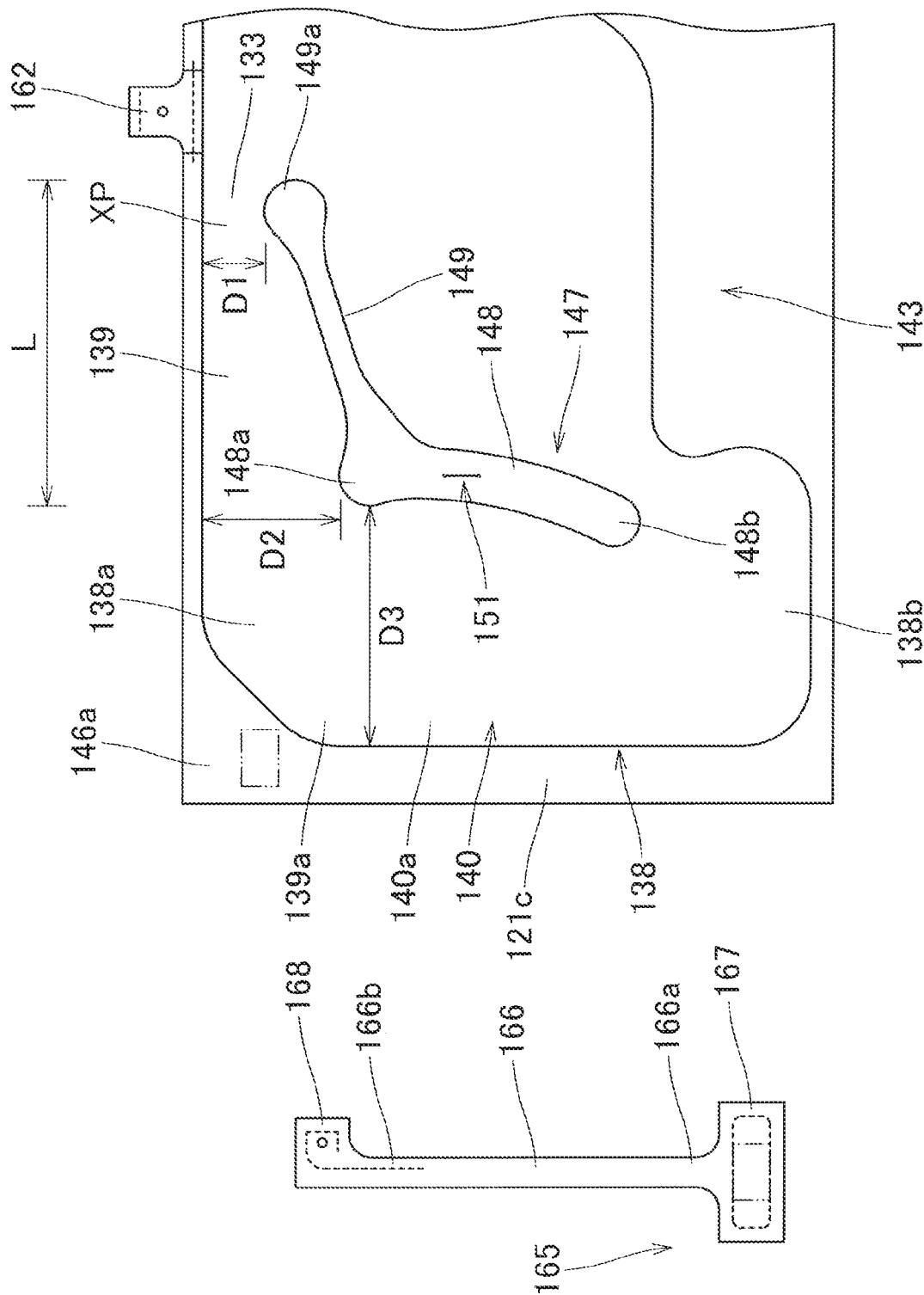
FIG. 13 is a partially enlarged front view illustrating a state in which the bag main body and the connection member are arranged side by side in the airbag in FIG. 10.

Specifically, as illustrated in FIG. 13, in the airbag 120 (bag main body 121) of the embodiment, a separation length D1 between the rear end 149a of the cross bar portion 149 of the end-side partition portion 147 and an upper edge part of the circumferential edge portion 146 is set to about a half of a separation length D2 between the upper end 148a of the vertical bar portion 148 of the end-side partition portion 147 and the upper edge part of the circumferential edge portion 146. In addition, the separation length D2 is set to be smaller than a separation length D3 between the upper end 148a of the vertical bar portion 148 of the end-side partition portion 147 and the front edge part of the circumferential edge portion 146 and is set to about four sevenths of the separation length D3. Further, In the case of the embodiment, the separation length D3 is set to be smaller than a length dimension L of the cross bar portion 149 in the front-rear direction of the end-side partition portion 147 and is set to about five sevenths of the length dimension L.

Figure 15:
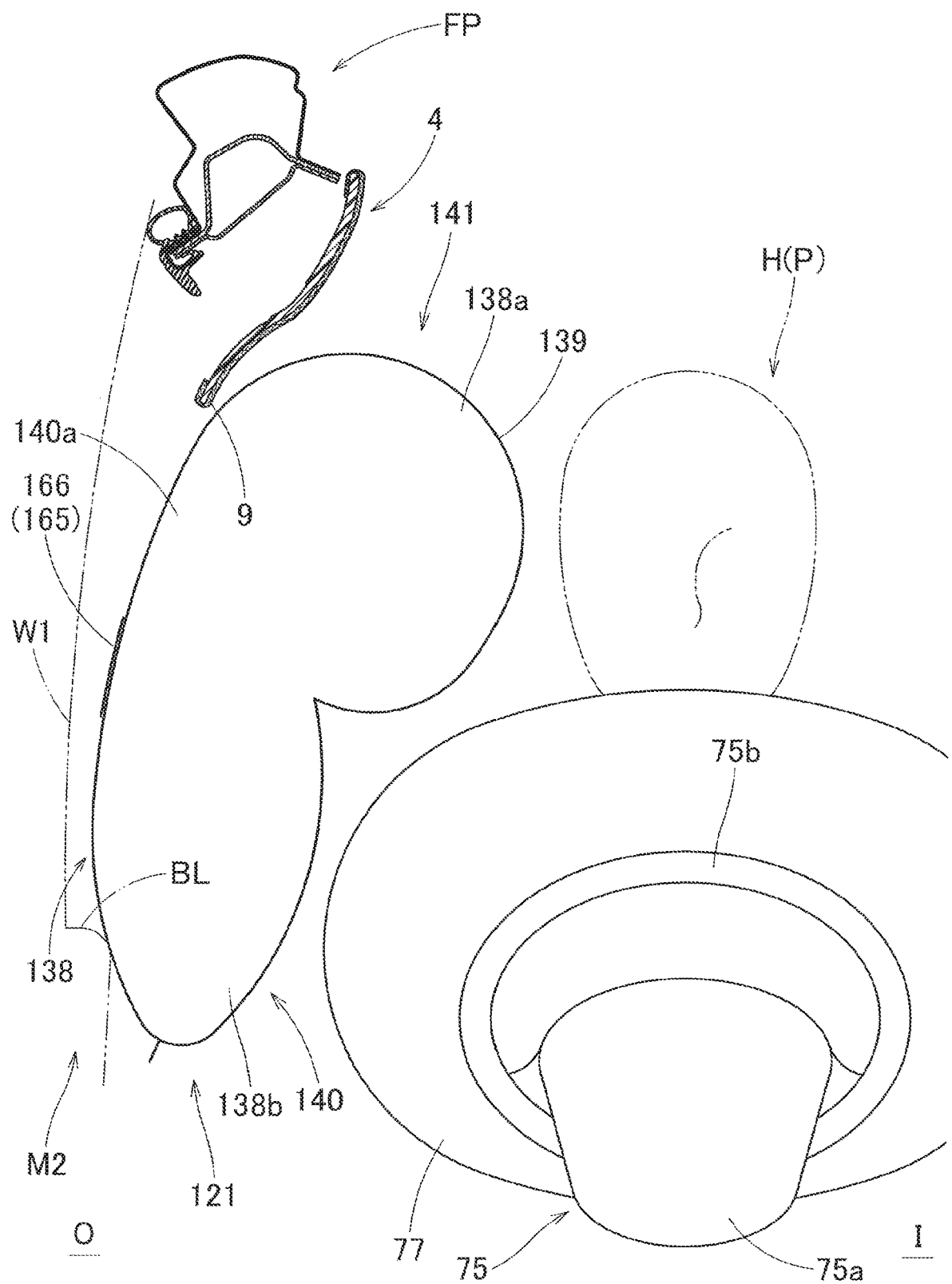
FIG. 15 is a partially enlarged sectional view taken along an up-down direction, schematically illustrating the state in which the airbag is completely inflated in the head protective airbag apparatus of the second embodiment.

In addition, the end-side inflation portion 138 is disposed in a state in which the lower end 138b side projects downward far below the belt line BL when the airbag 120 is completely inflated (refer to FIGS. 14 and 15). Further, in a state in which the steering wheel airbag 77, which is mounted on the steering wheel 75 in front of the driver seat DS, is completely inflated, the end-side inflation portion 138 is inflated such that the lower part 140 on the lower end 138b side and the steering wheel airbag 77 overlap each other on a side in a left-right direction (in a vehicle interior-exterior direction) (refer to FIGS. 14 and 16).

The non-inflation portion 145 is provided with the circumferential edge portion 146, which constitutes an outer circumference edge of the inflation portion 122, the end-side partition portion 147, the normal partition portions 153 and 158, and the thickness regulating portion 160 which are disposed in the region of the inflation portion 122, and the attachment portions 162 for attaching the side of the upper edge 121a of the bag main body 121 to the side of the body 1 of the vehicle V.

The circumferential edge portion 146 is disposed to surround the entire periphery of the inflation portion 122 except for the side of the rear end 126a of the connection port portion 126.

The end-side partition portion 147 forms the partition between the front auxiliary inflation portion 130 and the front protective portion 127 (the end-side inflation portion 138 and the normal inflation portion 143). Both upper and lower end sides of the end-side partition portion 147 are separated from the circumferential edge portion 146. Similar to the description above, the end-side partition portion 147 has the vertical bar portion 148 that is disposed to be substantially parallel to the up-down direction and the cross bar portion 149 that is disposed to be substantially parallel to the front-rear direction so as to extend toward an upper rear side from the upper end 148a of the vertical bar portion 148. In the case of the embodiment, the vertical bar portion 148 is configured to be slightly inclined with respect to the up-down direction and to have a substantially linear shape such that the lower end 148b thereof is positioned slightly to a front side from the upper end 148a thereof. The cross bar portion 149 is configured to be inclined toward the upper rear side with respect to the front-rear direction in a substantially linear shape such that the distal end (rear end 149a) thereof is positioned on the upper side from the upper end 148a of the vertical bar portion 148. The rear end 149a of the cross bar portion 149 projects upward far above an upper cross bar portion 156 of the normal partition portion 153. The vertical bar portion 148 of the end-side partition portion 147 is provided with the slit 151 into which the connection belt 165 is insertable. The slit 151 is formed in a state in which a cut that is substantially parallel to the up-down direction is made at a position slightly to an upper side from the center of the bag main body 121 in its vertical direction. In addition, a length dimension of the slit 151 is set to the extent that only a main body portion 166 of the connection belt 165 is insertable into the slit and a joining piece 167 on a side of a base portion 166a of the main body portion 166 is not insertable thereinto.

The normal partition portions 153 and 158 are disposed in a region of the normal inflation portion 143 and partition the normal inflation portion 143 into the gas guiding channel 125, the front protective portion 127, the rear protective portion 128, the center auxiliary inflation portion 131, and the rear auxiliary inflation portion 132. To be more specific, the normal partition portion 153 is provided with a lower cross bar portion 154, a vertical bar portion 155, and the upper cross bar portion 156. The lower cross bar portion 154 extends rearward to be parallel to the front-rear direction from a part of the circumferential edge portion 146 on the side of the lower edge and forms the partition between the center auxiliary inflation portion 131 and the rear auxiliary inflation portion 132. The vertical bar portion 155 extends upward from a rear end of the lower cross bar portion 154 so as to be parallel to the up-down direction and forms a partition between the center auxiliary inflation portion 131 and the rear protective portion 128. The upper cross bar portion 156 extends forward from an upper end of the vertical bar portion 155 so as to be parallel to the front-rear direction and forms a partition between the gas guiding channel 125 and the center auxiliary inflation portion 131. The normal partition portion 158 extends from the part of the circumferential edge portion 146 on the side of the lower edge toward an upper rear side and is bent such that a distal end of the normal partition portion is oriented downward, in a region below a front end 156a of the upper cross bar portion 156. The normal partition portion 158 partitions a region of the front protective portion 127 and the center auxiliary inflation portion 131 on the side of the lower edge.

The thickness regulating portion 160 is formed to project upward from the side of the lower edge of the circumferential edge portion 146, in the vicinity of a boundary part between the rear auxiliary inflation portion 132 and the rear protective portion 128. In the airbag 120 of the embodiment, a gap between the rear end 149a of the cross bar portion 149 of the end-side partition portion 147 and the side of the upper edge of the circumferential edge portion 146 constitutes the communication portion 133. A gap between the lower end 148b of the vertical bar portion 148 of the end-side partition portion 147 and the side of the lower edge of the circumferential edge portion 146 constitutes the communication portion 134. A gap between the front end 156a of the upper cross bar portion 156 of the normal partition portion 153 and the normal partition portion 158 constitutes the communication portion 135. A gap between the rear end of the lower cross bar portion 154 of the normal partition portion 153 and the thickness regulating portion 160 constitutes the communication portion 136.

The attachment portions 162 are provided at a plurality of positions on the side of the upper edge 121a of the bag main body 121 in the front-rear direction, and four attachment portions 162 are formed in the case of the embodiment. The attachment portion 162 is fixed to the inner panel 2 on the side of the body 1 in a part of the roof side rail RR, by using the attachment bracket 11 and the attachment bolt 12. Specifically, the attachment portion 162 is not disposed in the region of the end-side inflation portion 138 (the front auxiliary inflation portion 130) so as not to interfere with the projection of the upper end 138*a* of the end-side inflation portion 138 (the upper part 139) toward the vehicle interior side, when the airbag 120 is completely inflated. In other words, in the airbag 120 of the embodiment, the attachment portions 162 are provided in a region on a rear side from the rear end 149*a* of the cross bar portion 149 of the end-side partition portion 147. The attachment portion 162 is provided with an attachment hole 162*a* into which the attachment bolt 12 is inserted.

The connection belt 165 extends from the front end 121*c* side of the bag main body 121 and is fixed to the side of the body 1 of the vehicle V when the bag main body 121 is completely inflated. In the case of the embodiment, the connection belt 165 constitutes the maintaining means that maintains the projection state of the upper part 139 (the vehicle interior-side projection portion 141) toward the vehicle interior side when the bag main body 121 is completely inflated. The connection belt 165 is configured of a flexible sheet material, and is formed of a woven fabric made of a polyamide yarn, a polyester yarn, or the like in the case of the embodiment. The connection belt 165 is able to maintain a disposition state in which the vicinity of an upper front end of the end-side inflation portion 138 is disposed to approach a lower rear side toward the vehicle interior side, in the airbag 120 which is in the flatly deployed state. Even when the bag main body 121 is completely inflated, the connection belt 165 maintains the projection state of the upper part 139 (the vehicle interior-side projection portion 141) toward the vehicle interior side when the bag main body 121 is completely inflated, then the connection belt 165 constitutes the maintaining means. Specifically, the connection belt 165 is disposed to be substantially parallel to the front-rear direction on the vehicle exterior side O of the lower part 140 of the end-side inflation portion 138 when the airbag 120 is completely inflated by joining the base side to the bag main body 121 and fixing the distal end side to the side of the body 1 of the vehicle V on a circumferential edge of the window W1. The connection belt 165 is provided with the strip-shaped main body portion 166 that is inserted into the slit 151, the joining piece 167 that is formed on the base portion 166*a* side of the main body portion 166 and is joined to the side of the bag main body 121, and an attachment portion 168 that is formed on a distal end 166*b* side of the main body portion 166. The joining piece 167 is formed to have a width wider than the main body portion 166 and to project upward and downward from the main body portion 166. In other words, the joining piece 167 is configured to have a width wider than the slit 151 and not to be insertable into the slit 151. Similar to the attachment portion 162 that is formed on the bag main body 121, the attachment portion 168 is fixed to the inner panel 2 on the side of the body 1 in the part of the front pillar FP which is the circumferential edge of the window W1 by using the attachment bracket 11 and the attachment bolt 12, and the attachment portion 168 is provided with an attachment hole 168*a* into which the attachment bolt 12 is insertable.

Figure 11:
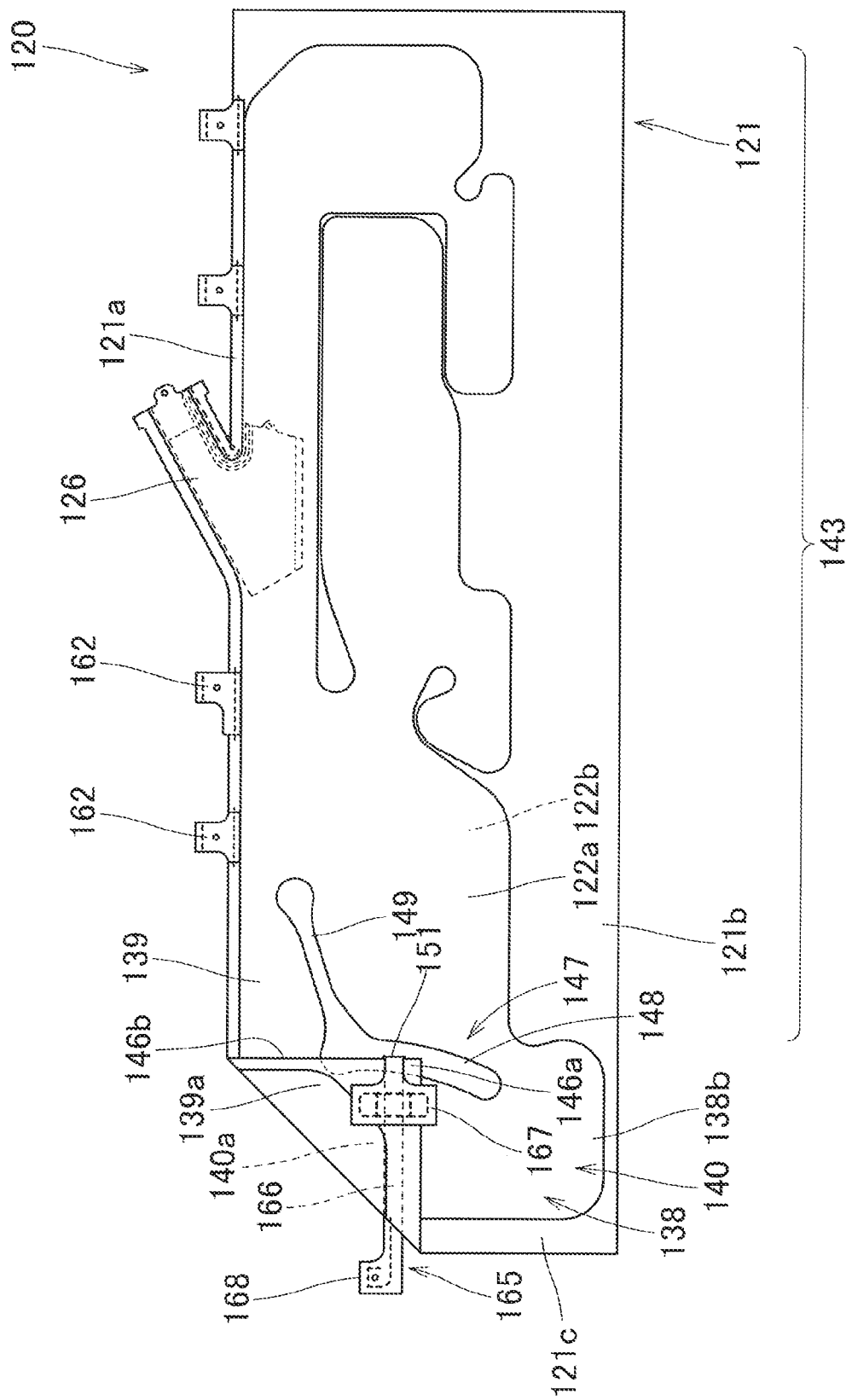
FIG. 11 is a front view illustrating a state in which the bag main body is pre-folded and a connection member is inserted into a slit in the airbag in FIG. 10.

As illustrated in FIG. 10, in a state in which the bag main body 121 is flatly deployed, the connection belt 165 is disposed to be substantially parallel to the up-down direction such that the joining piece 167 is sewed (joined) to an upper front corner 146*a* of the circumferential edge portion 146 (a front edge 139*a* side of the upper part 139 of the end-side inflation portion 138) in the bag main body 121, and the main body portion 166 extends upward from the joining piece 167. To be more specific, the joining piece 167 is placed on the vehicle exterior side O (the vehicle exterior-side wall portion 122*b* side) of the bag main body 121. As illustrated in FIGS. 11 and 12A, the connection belt 165 is folded together with the bag main body 121, in which a side of an upper front edge of the bag main body 121 is folded back toward the vehicle interior side, in a state in which the main body portion 166 is inserted into the slit 151 from the vehicle interior side I to the vehicle exterior side O and is disposed to cover the vehicle exterior side O of the lower part 140 of the end-side inflation portion 138. At this time, as illustrated in FIG. 10, the bag main body 121 is folded back such that a region in the vicinity of the upper front end of the end-side inflation portion 138 (the side of the front edge 139*a* of the upper part 139) approaches a lower rear side toward the vehicle interior side and is placed on the vehicle interior-side wall portion 122*a* side on the folding-back line CL2 that is inclined toward an upper rear side. To be more specific, when the side of the upper edge of the end-side inflation portion 138 (the upper edge 146*b* of the circumferential edge portion 146) is disposed to be substantially parallel to the up-down direction substantially along the slit 151 at a position that is substantially coincident with the slit 151 (refer to FIG. 11). In addition, at this time, as illustrated in FIG. 12A, the connection belt 165 itself is disposed in a state in which the joining piece 167 is exposed on the vehicle interior side I, the base side of the main body portion 166 in the vicinity of the joining piece 167 is inserted into the slit 151 and is reversed, and a part of the main body portion 166, which is disposed on the vehicle exterior side O of the end-side inflation portion 138, is oriented to be substantially parallel to the front-rear direction such that the attachment portion 168 is oriented forward. A length dimension of the connection belt 165 (a length dimension of the main body portion 166) is set to a dimension by which the disposition state in which the vicinity of the upper front end of the end-side inflation portion 138 (the side of the front edge 139*a* of the upper part 139) is displaced to a lower rear side toward the vehicle interior side is maintained, and the region of the upper front end side of the end-side inflation portion 138 (the side of the front edge 139*a* of the upper part 139), to which joining piece 167 is joined, can be brought into press contact with a surface on the vehicle interior side of the lower part 140 of the end-side inflation portion 138 while tension is generated substantially along the main body portion 166, when the bag main body 121 is completely inflated while mounted on the vehicle.

When the bag main body 121 is completely inflated, the connection belt 165 is disposed such that a part of the main body portion 166, which is disposed on the vehicle exterior side of the lower part 140 of the end-side inflation portion 138, is oriented to be substantially parallel to the front-rear direction while the upper part 139 of the upper end 138*a* side of the end-side inflation portion 138 projects toward the vehicle interior side. In the bag main body 121 of the embodiment, the end-side partition portion 147 that forms the partition between the end-side inflation portion 138 and the normal inflation portion 143 has a configuration in which the cross bar portion 149 is disposed to be inclined toward an upper rear side, and the smallest separation length D1 is obtained between the rear end 149*a* side and the circumferential edge portion 146. In other words, the rear end side of the upper part 139 of the end-side inflation portion 138 has the narrowest width. Therefore, the end-side inflation portion 138 is bent from the starting point XP which is the vicinity of the rear end 149a of the cross bar portion 149 (the vicinity of the communication portion 133, that is, the vicinity of the rear end of the upper part 139 of the end-side inflation portion 138), when the bag main body 121 is completely inflated. This starting point XP is set a rear side from the folding-back line CL2 obtained at the time of folding and storing, and the entire front to rear region of the upper part 139 can project toward the vehicle interior side (refer to FIG. 14). In addition, the joining piece 167 on the base side of the connection belt 165 is joined to the circumferential edge portion 146 that constitutes the non-inflation portion 145 in the bag main body 121. When the bag main body 121 is completely inflated, the upper front corner 146a of the circumferential edge portion 146, to which the joining piece 167 is joined, is bent with respect to the end-side inflation portion 138 (the upper part 139) due to the tension generated along the main body portion 166 and is disposed by being folded in on the vehicle exterior side O of the upper part 139 (refer to FIG. 12B). In other words, the vehicle interior side of the joining piece 167 on the base side of the connection belt 165 is also covered with the upper part 139 of the end-side inflation portion 138 (refer to FIG. 14), and the connection belt 165 is disposed to have a linear shape that is substantially parallel to the front-rear direction when viewed in the up-down direction side (refer to FIGS. 12B and 16). At this time, to be more exact, the end-side inflation portion 138 is disposed to have a large chamber shape in one room with the upper part 139 and the upper region 140a of the lower part 140, by removing a crease of a folding-back line CL2 at the time of the folding and storing (refer to FIG. 15), and the vehicle interior-side projection portion 141 projects toward the vehicle interior side in a state in which an inflation region is disposed on the vehicle interior side while the upper edge 146b of the circumferential edge portion 146, which constitutes the side of the upper edge, is reversed.

Figure 16:
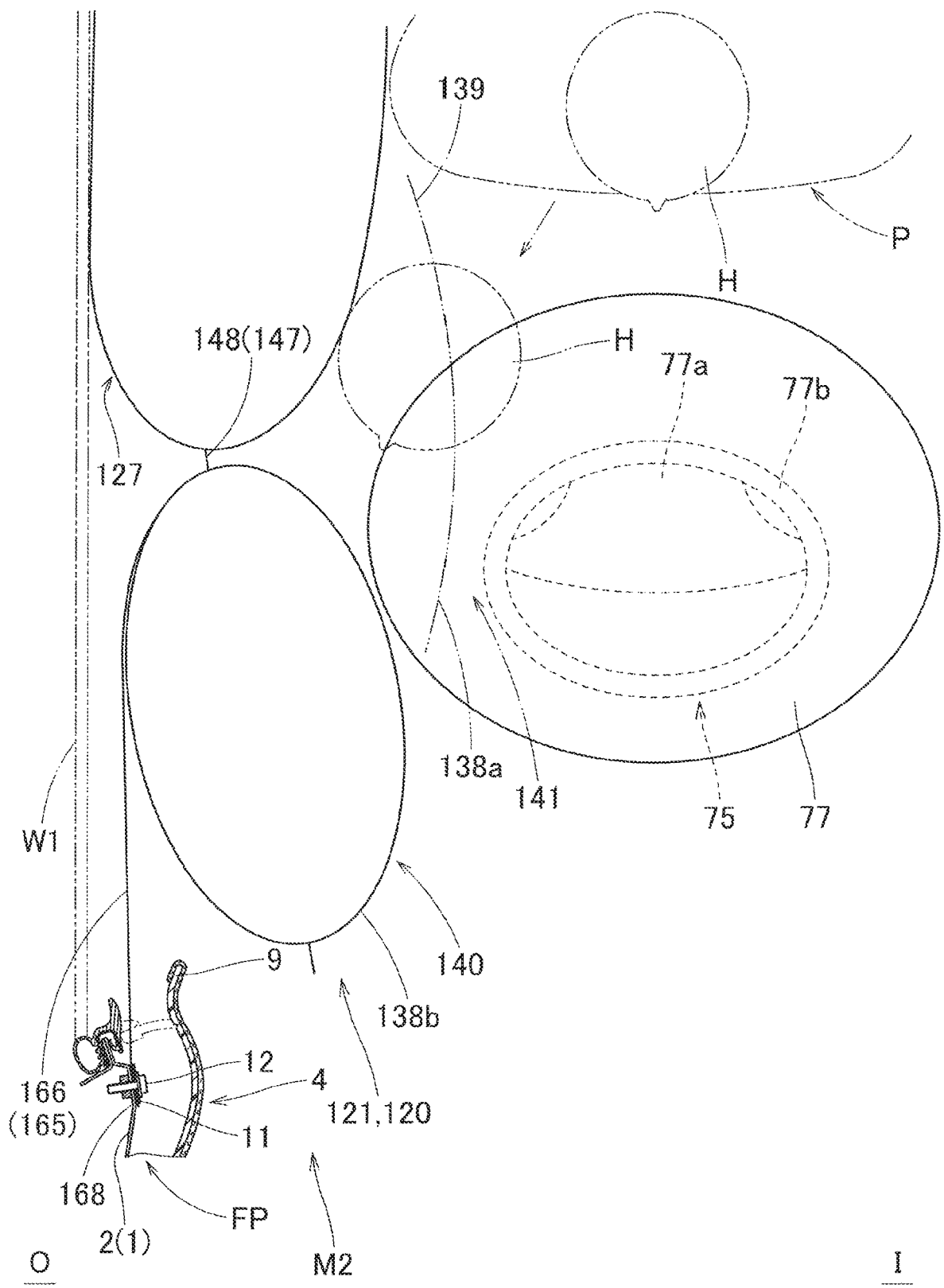
FIG. 16 is a partially enlarged sectional view taken along a front-rear direction, schematically illustrating the state in which the airbag is completely inflated in the head protective airbag apparatus of the second embodiment.

Also, in the head protective airbag apparatus M2 of the second embodiment, the end-side inflation portion 138 that is disposed on the front end 121c side is disposed such that the upper part 139 on the upper end 138a side projects more toward the vehicle interior side than the lower part 140 on the lower end 138b side, when the airbag 120 is completely inflated. In addition, the upper part 139 that projects toward the vehicle interior side is disposed in a state in which the region from the upper rear side of the vertical bar portion 148 to the lower front side of the vertical bar portion 148 is inflated. Therefore, in the head protective airbag apparatus M2 of the second embodiment, as illustrated in FIGS. 15 and 16, even when the steering wheel airbag 77, which is inflated in front of the driver seat DS (seat), is disposed to be close to the apparatus on the vehicle interior side, it is possible to suppress the interference of the lower end 138b side part of the end-side inflation portion 138 (lower part 140) with the airbag 77, and it is possible to dispose the upper part 139, which projects toward the vehicle interior side on the upper end 138a side, (to be more specific, the vehicle interior-side projection portion 141 that is configured of the upper part 139 and the upper region 140a of the lower part 140) fills a gap between the window W1 and the airbag 77 that is inflated in front of the driver seat DS. Therefore, when the head H of a driver P who is the occupant moves obliquely forward toward the vehicle exterior side during the oblique collision, the offset collision, or the like, the upper part 139 is able to accurately receive the head H. In addition, the upper part 139 (vehicle interior-side projection portion 141) is configured to be disposed, in a state in which the region from the upper rear side of the vertical bar portion 148 to the lower front side of the vertical bar portion 148 is inflated, and the connection belt 165 as the maintaining means maintains the projection state of the upper part 139 toward the vehicle interior side I when the inflation is completed. Therefore, it is possible to stably maintain the projection state of the upper part 139 toward the vehicle interior side I, and the upper part 139 (the vehicle interior-side projection portion 141), which is inflated to be wide in the front-rear direction, is able to accurately receive the head H of the occupant P who moves obliquely forward toward the vehicle exterior side.

Specifically, in the head protective airbag apparatus M2 of the second embodiment, the connection belt 165 as the maintaining means extends from the side of upper front end of the end-side inflation portion 138 (the front edge 139a side of the upper part 139) and is disposed to cover the vehicle exterior side O of the end-side inflation portion 138 in a state in which the connection belt is inserted into the slit 151 that is formed in the end-side partition portion 147 of the bag main body 121 from the vehicle interior side I to the vehicle exterior side O, and the distal end side thereof is fixed to the inner panel 2 on the side of the body. Therefore, when the bag main body 121 is completely inflated, the region on the upper front end side of the end-side inflation portion 138 (the front edge 139a side of the upper part 139), to which joining piece 167 is joined, can be brought into press contact with the surface on the vehicle interior side of the lower part 140 of the end-side inflation portion 138 due to the tension generated substantially along the main body portion 166 of the connection belt 165, and the projection state toward the vehicle interior side I of the upper part 139 (vehicle-interior side projection portion 141) (a displacement state of the side of the upper front end of the end-side inflation portion 138 to the lower side toward the vehicle interior side) can be maintained in this configuration. In addition, in the head protective airbag apparatus M2 of the second embodiment, the main body portion 166 of the connection belt 165 is configured to be disposed on the vehicle exterior side O of the lower part 140 of the end-side inflation portion 138 through the slit 151, and thus the region on the lower end 138b side of the end-side inflation portion 138 (the region of the lower part 140 below the slit 151) is unlikely to be influenced by the connection belt 165 and projection of this region toward the vehicle interior side I is suppressed.

Hence, in the head protective airbag apparatus M2 of the second embodiment, it is possible to suppress the interference with the airbag 77 that is inflated to be close to the apparatus on the vehicle interior side, and thus it is possible to accurately protect the head H of the driver P who is the occupant even during the oblique collision or the offset collision.

In addition, in the head protective airbag apparatus M2 of the second embodiment, the end-side inflation portion 138 is disposed in a state in which the side of the lower end 138b is positioned downward far below the belt line BL when the inflation is completed. Therefore, when the upper end 138a side part (vehicle interior-side projection portion 141) receives the head H of the occupant P which moves obliquely forward toward the vehicle exterior side, the lower end 138b side part can be supported by the member such as a door trim that is disposed to project more toward the vehicle interior side than the window W1 below the belt line BL. Then, it is possible to more accurately restrict the head H of the occupant P by the end-side inflation portion 138.

Figure 19:
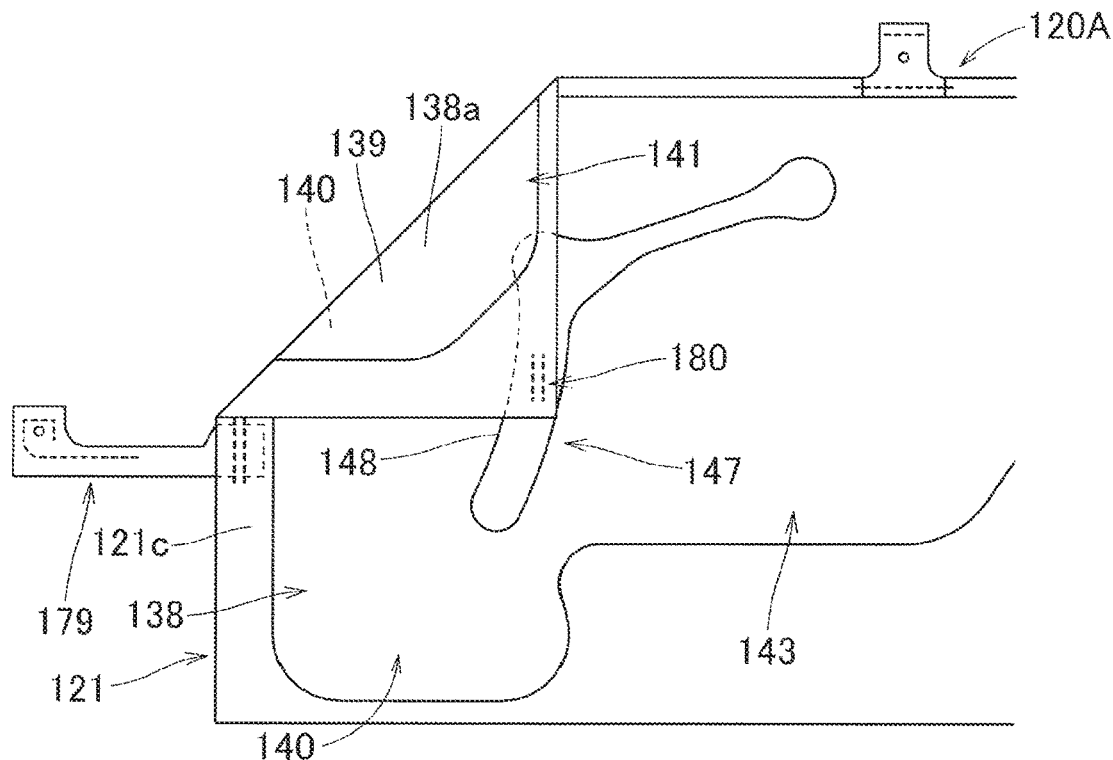
FIG. 19 is a partially enlarged front view illustrating a state in which another type of airbag, which is usable in the second embodiment, is flatly deployed.

In the head protective airbag apparatus M2 of the second embodiment, the connection belt 165, which connects the side of the front end 121c of the bag main body 121 to the side of the body 1 of the vehicle V, is used as maintaining means that maintains the projection state of the vehicle interior-side projection portion 141 toward the vehicle interior side when the inflation is completed, and the upper front end side of the end-side inflation portion 138 (the side of the upper front edge of the circumferential edge portion 146) is indirectly connected to the region of the bag main body 121 on the lower rear side (the vertical bar portion 148 of the end-side partition portion 147). However, the maintaining means is not limited to that in the embodiment. Like the airbag 120A illustrated in FIG. 19, a connection belt 179, which connects the front end 121c side of the bag main body 121 to the side of body, is separately disposed, and the upper front end side of the end-side inflation portion 138 (the upper front edge side of the circumferential edge portion 146) is joined (sewed) to the region on the lower rear side of the bag main body 121 (the vertical bar portion 148 of the end-side partition portion 147) directly. In this manner, a joining member 180, as the maintaining means, is configured to maintain the projection state toward the vehicle interior side of the upper front end of the end-side inflation portion 138 (a displacement state of the vicinity of the upper front end of the end-side inflation portion 138 to the lower side toward the vehicle interior side) when the inflation is completed.

Figure 17A:
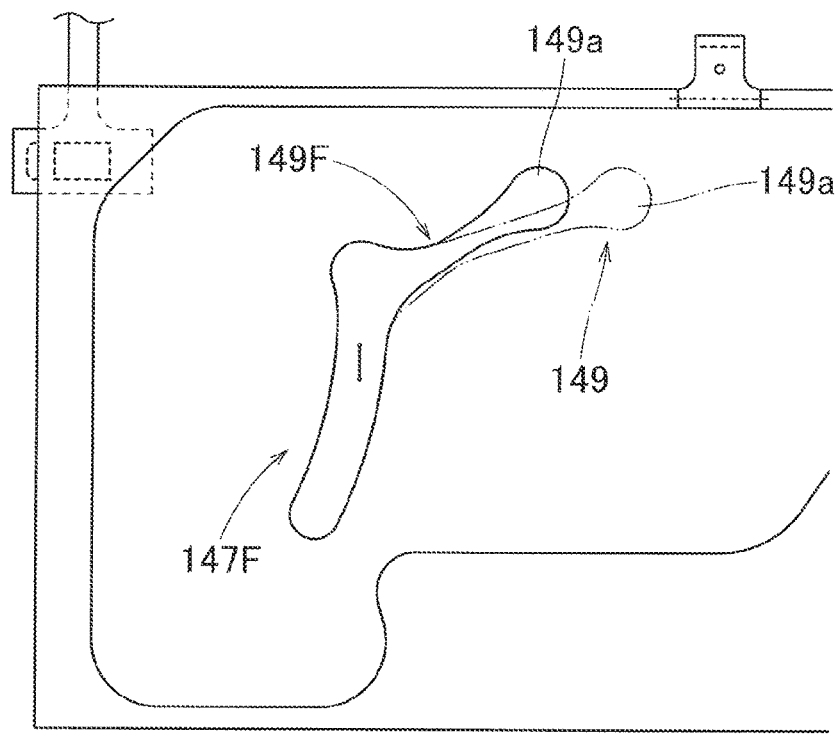
FIGS. 17A and 17B are partially enlarged front views illustrating a state in which a position of a distal end of a cross bar portion of an end-side partition portion is shifted toward a front side or a rear side in the airbag that is used in the second embodiment.
Figure 17B:
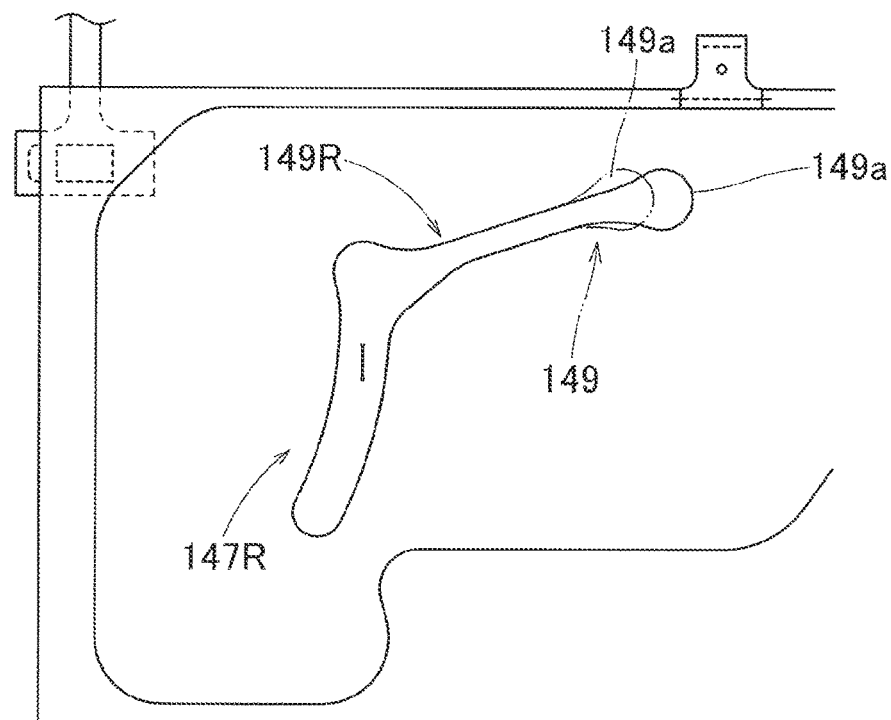

In addition, in the head protective airbag apparatus M2 of the second embodiment, the end-side partition portion 147, which forms the partition between the end-side inflation portion 138 and the normal inflation portion 143, has the vertical bar portion 148, which is disposed to be substantially parallel to the up-down direction so as to form the partition between the end-side inflation portion 138 and the normal inflation portion 143, and the cross bar portion 149, which extends rearward from the upper end 148a of the vertical bar portion 148. Therefore, when the airbag 120 is completely inflated, the upper part 139 of the end-side inflation portion 138 is bent to project toward the vehicle interior side I, with the part in the vicinity of the distal end (rear end 149a) of the cross bar portion 149 (the vicinity of the communication portion 133) as the starting point, and thus the upper end 138a side (the upper part 139) of the end-side inflation portion 138 can be smoothly project toward the vehicle interior side. In addition, in the head protective airbag apparatus M2 of the second embodiment, it is possible to easily set the width dimension of the vehicle interior-side projection portion 141 on the side in the front-rear direction by adjusting the position of the rear end 149a of the cross bar portion 149 in its front-rear direction. Specifically, as illustrated in FIG. 17A, when the rear end 149a of a cross bar portion 149F of an end-side partition portion 147F is configured to be shifted toward the front side, compared to the cross bar portion 149 (when the cross bar portion 149F has a short length dimension), it is possible to decrease the width dimension of the upper part on the side in the front-rear direction. Conversely, as illustrated in FIG. 17B, when the rear end 149a of a cross bar portion 149R of an end-side partition portion 147R is configured to be shifted toward the rear side, compared to the cross bar portion 149 (when the cross bar portion 149R has a long length dimension), it is possible to increase the width dimension of the upper part on the side in the front-rear direction. It is possible to perform such adjustment appropriately depending on the vehicle. In addition, it is possible to appropriately change the position, an amount of projection, a size, or the like of the upper part (vehicle interior-side projection portion) by changing a separation length or the like from the circumferential edge portion of the end-side partition portion. For example, when the separation length D2 between the upper end 148a of the vertical bar portion 148 and the upper edge part of the circumferential edge portion 146 or the separation length D3 between the upper end 148a of the vertical bar portion 148 and the front edge part of the circumferential edge portion 146 is set to be long, it is possible to make the region thick by inflating the region on the front side of the upper part (vehicle interior-side projection portion) when the inflation is completed. When the separation length D1 between the rear end 149a of the cross bar portion 149 and the upper edge part of the circumferential edge portion 146 is set to be long, it is possible to make the region thick by inflating the region on the rear side of the upper part (vehicle interior-side projection portion) when the inflation is completed. When the length dimension of the cross bar portion 149 on the side in the front-rear direction is long, it is possible to increase the width dimension of the upper part (vehicle interior-side projection portion) on the side in the front-rear direction when the inflation is completed.

If such a point described above is not considered, it is possible to use a configuration in which only the vertical bar portion is provided as the end-side partition portion and the cross bar portion is not provided. In a case of such a configuration, it is possible to appropriately change the width dimension of the upper part on the side in the front-rear direction when the inflation is completed by changing an angle of the folding-back line at the time of folding and storing the airbag.

Figure 18:
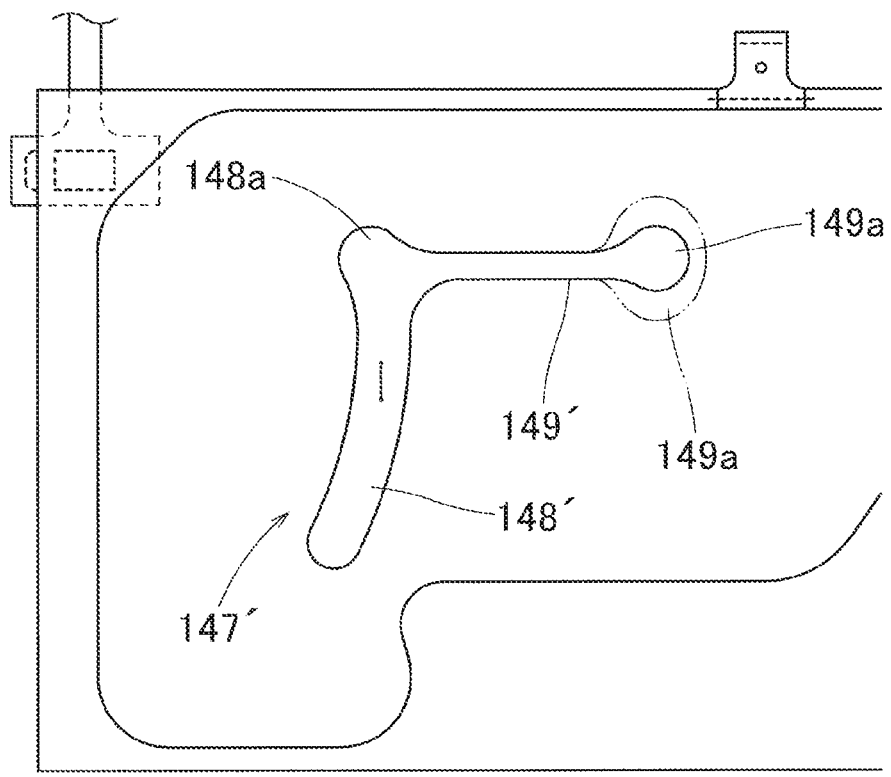
FIG. 18 is a partially enlarged front view illustrating a modification example of the airbag that is used in the second embodiment.

In particular, in the head protective airbag apparatus M2 of the second embodiment, the distal end (rear end 149a) of the cross bar portion 149 of the end-side partition portion 147 is disposed above the upper end 148a of the vertical bar portion 148, and thus the upper part 139, that is configured to gradually increase the amount of the projection toward the vehicle interior side I toward the upper end 148a side of the vertical bar portion 148, which is disposed on the front side, can be stably formed, with the part in the vicinity of the rear end 149a of the cross bar portion 149 as the starting point XP, when the airbag 120 is completely inflated. In other words, in the head protective airbag apparatus M2 of the second embodiment, the vehicle interior-side projection portion 141 has a configuration in which the amount of the projection thereof toward the vehicle interior side is increased over the front end side, when the airbag 120 is completely inflated. In addition, in such a configuration, it is possible to reliably bend the upper part 139 such that the upper part projects toward the vehicle interior side, with the part in the vicinity of the rear end 149a of the cross bar portion 149 as the starting point XP. If such a point described above is not considered, as illustrated in FIG. 18, the cross bar portion 149', as an end-side partition portion 147', may be configured to be substantially parallel to the front-rear direction, and the rear end 149a may be configured to be disposed at a position equivalent to that of the upper end 148a of the vertical bar portion 148'. In addition, as illustrated by a two-dot chain line in FIG. 18, the cross bar portion may be configured to be substantially parallel to the front-rear direction, and only the rear end 149a may be configured to project more upward than the upper end 148a of the vertical bar portion 148' having a wide width.

Figure 20:
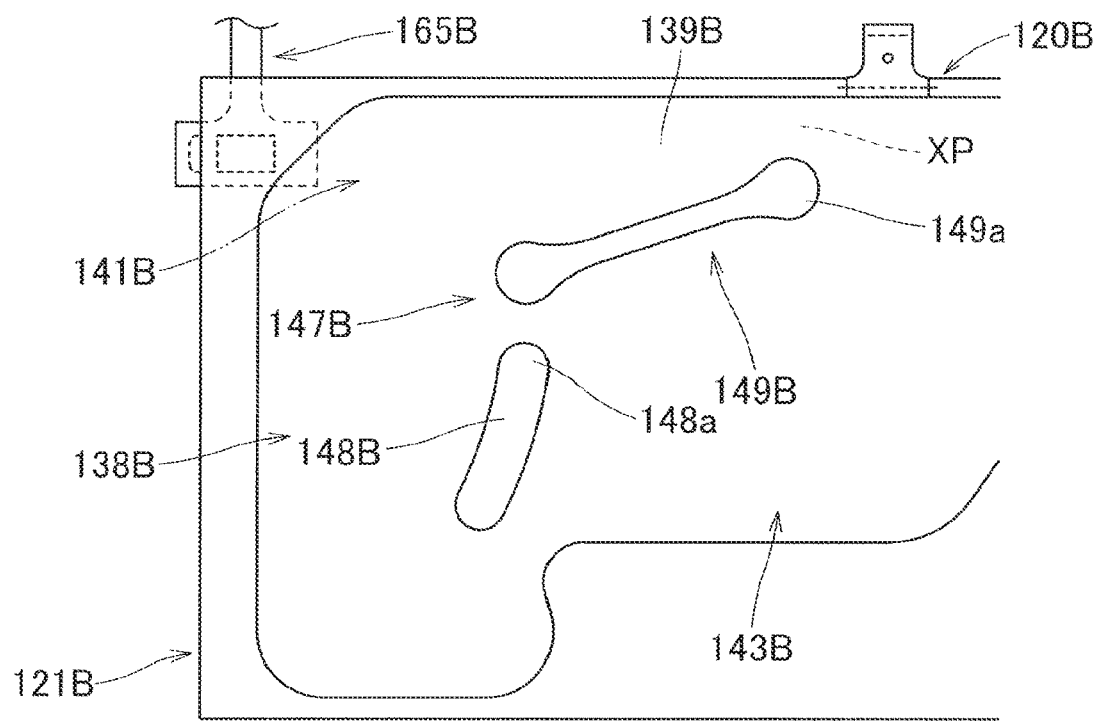
FIG. 20 is a partially enlarged front view illustrating a state in which a bag main body is flatly deployed in still another type of airbag, which is usable in the second embodiment.

In addition, in the airbag 120 of the embodiment, the end-side partition portion 147 has a configuration in which the vertical bar portion 148 and the cross bar portion 149 are continuous to each other. However, as illustrated in an airbag 120B in FIG. 20, as an end-side partition portion 147B, a vertical bar portion 148B and a cross bar portion 149B are separated from each other, and the cross bar portion 149B may be configured to extend to be substantially parallel to the front-rear direction from the upper side of the vertical bar portion 148B toward the rear side. FIG. 20 illustrates a configuration in which the cross bar portion 149B is inclined toward an upper rear side; however, the cross bar portion may be disposed to be parallel to the front-rear direction such that the rear end is disposed at a position substantially equivalent to that of the front end.

Figure 21:
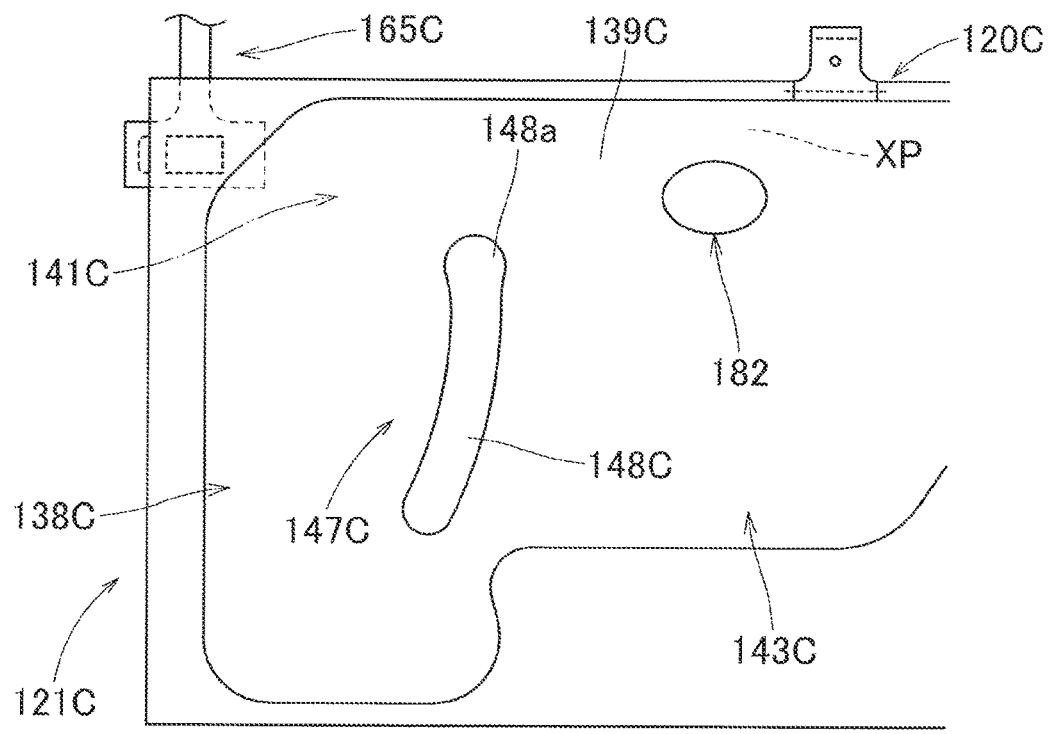
FIG. 21 is a partially enlarged front view illustrating a state in which a bag main body is flatly deployed in still another type of airbag, which is usable in the second embodiment.

Further, as illustrated in an airbag 120C in FIG. 21, an end-side partition portion 147C may be configured to have a vertical bar portion 148C, which is disposed to be substantially parallel to the up-down direction so as to form the partition between an end-side inflation portion 138C and a normal inflation portion 143C, and a separation portion 182, which is disposed on a rear side from the vertical bar portion 148C. FIG. 21 illustrates a configuration in which the separation portion 182 is disposed to be closer to an upper side than to the upper end 148a of the vertical bar portion 148C. Even in a case where the end-side partition portion 147C has such a configuration, it is possible to bend the part on the side of the upper end of the end-side inflation portion 138C such that the part projects toward the vehicle interior side, with the part in the vicinity of the separation portion 182 as the starting point XP, when the airbag 120C is completely inflated, although not illustrated in detail, and thus it is possible to cause the upper end 138a side (a vehicle interior-side projection portion 141C) of the end-side inflation portion 138C to smoothly project toward the vehicle interior side. In addition, it is possible to easily set a width dimension of the vehicle interior-side projection portion 141C on the side in the front-rear direction by adjusting the position of the separation portion 182 in its front-rear direction. The separation portion may be configured to be disposed to be closer to an upper side than to the upper end of the vertical bar portion or to be disposed at a position substantially equivalent to that of the upper end of the vertical bar portion.

Figure 22:
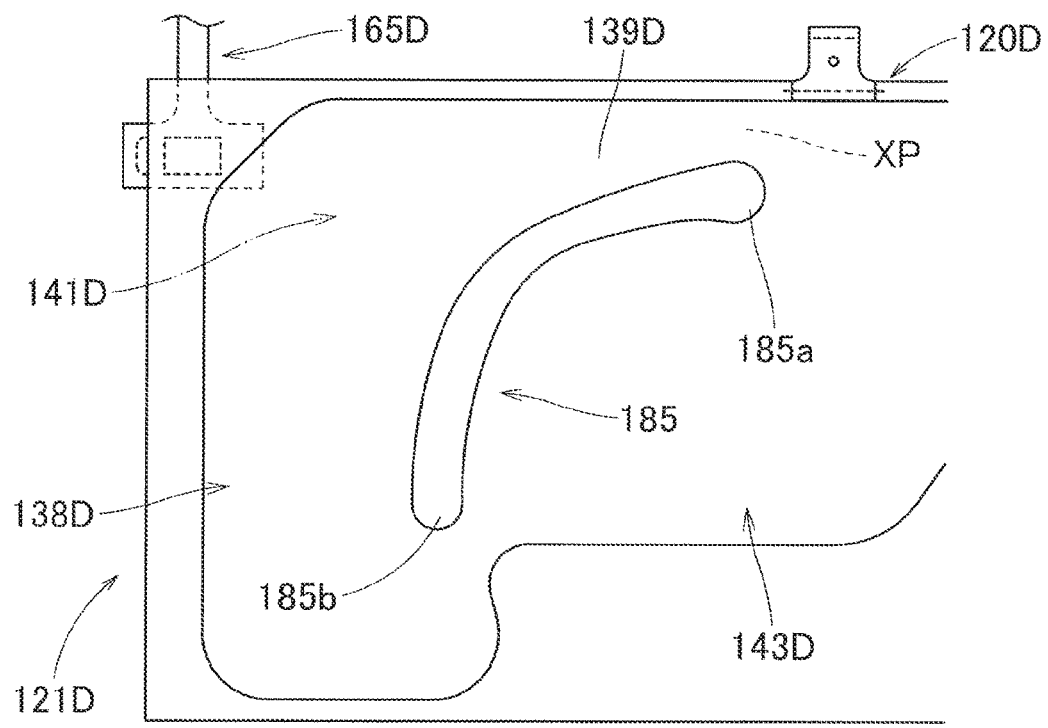
FIG. 22 is a partially enlarged front view illustrating a state in which a bag main body is flatly deployed in still another type of airbag, which is usable in the second embodiment.

In addition, as illustrated in the airbag 120D in FIG. 22, an end-side partition portion 185, which forms the partition between an end-side inflation portion 138D and a normal inflation portion 143D, may be configured to be disposed to extend by being bent toward an upper rear side from the vicinity of the lower end 138b of the end-side inflation portion 138D. To be more specific, the end-side partition portion 185 has a configuration in which a lower end 185b is disposed at a position substantially equivalent to the lower end 148b of the vertical bar portion 148 of the end-side partition portion 147, an external shape thereof is a substantially ¼ arc shape, and the distal end (upper end 185a) is oriented to an upper rear side. Even in a case where the end-side partition portion 185 has such a configuration, it is possible to bend the part on the upper end side of the end-side inflation portion 138D such that the part projects toward the vehicle interior side, with the vicinity part of the upper end 185a (distal end) of the end-side partition portion 185 as the starting point XP, when the airbag 120D is completely inflated, although not illustrated in detail, and thus it is possible to cause the upper end 138a side part (a vehicle interior-side projection portion 141D) of the end-side inflation portion 138D to smoothly project toward the vehicle interior side. In addition, it is possible to easily set the width dimension of the vehicle interior-side projection portion 141C in the front-rear direction side by adjusting the position of upper end 185a (distal end) of the end-side partition portion 185 in its front-rear direction.

What is claimed is:
1. A head protective airbag apparatus comprising:
an airbag that is configured to be folded and stored on a side of an upper edge of a window on a vehicle interior side of a vehicle in which a side of an upper edge of the airbag is attached and fixed to a side of a body of the vehicle, and an inflating gas is caused to flow into an inside of the airbag such that the airbag is deployed and inflated to cover a vehicle interior side of the window while projecting downward; and
an inflator that supplies the inflating gas to the airbag,
wherein the airbag has
a bag main body which is flexible and has a bag shape and of which a side of an upper edge is fixed to the side of the body of the vehicle on the side of the upper edge of the window at a plurality of positions in a front-rear direction of the vehicle, and
a connection member which is configured of a flexible sheet material and of which a side of a base portion is joined to the bag main body and a side of a distal end is fixed to a circumferential edge of the window on the side of the body of the vehicle,
wherein the bag main body is provided with an end-side inflation portion that is disposed on a front end side thereof when inflation is completed, a normal inflation portion that is disposed on a rear side of the end-side inflation portion, and a slit in an intermediate part of the bag main body in an up-down direction between the normal inflation portion and the end-side inflation portion, into which the connection member is insertable,
wherein the connection member has a configuration in which the base side thereof is joined to the bag main body which is in a flatly deployed state at a position on a front side from the slit and is disposed to cover a vehicle exterior side of the end-side inflation portion, and the distal end side thereof is fixed to the side of the body of the vehicle at a position on a forward side from the slit in a state in which the connection member is inserted into the slit from the vehicle interior side to the vehicle exterior side,
wherein the bag main body is disposed to be pulled by the connection member when the airbag is completely inflated, by joining the base side of the connection member at a position on an upper side from the slit such that a vicinity of a part of the end-side inflation portion, which is joined to the base side of the connection member, has an orientation toward the vehicle interior side,
wherein the airbag is configured to be folded and mounted on the vehicle such that the upper edge side of the end-side inflation portion of the bag main body which is in the flatly deployed state is positioned in the vicinity of the front side of the slit in a pre-folded state in which the airbag is folded back toward the vehicle interior side, and then a lower edge thereof approaches the side of the upper edge thereof,
wherein the connection member is configured to have a substantially strip shape,
wherein the slit is formed to be substantially parallel to a width direction of the connection member that is inserted into the slit in a state in which the bag main body is pre-folded, and
wherein the base side of the connection member is joined to the upper front corner of the bag main body in a state in which the bag main body is flatly deployed.

2. The head protective airbag apparatus according to claim 1,
wherein an exterior-side part of the connection member, which covers the exterior side of the end-side inflation portion, is disposed to be substantially parallel to the front-rear direction in the state in which the bag main body is pre-folded.

3. A head protective airbag apparatus comprising:
an airbag that is configured to be folded and stored on a side of an upper edge of a window on a vehicle interior side of a vehicle in which a side of an upper edge of the airbag is attached and fixed to a side of a body of the vehicle and an inflating gas is caused to flow into an inside of the airbag such that the airbag is deployed and inflated to cover a vehicle interior side of the window while projecting downward; and
an inflator that supplies the inflating gas to the airbag,
wherein the airbag is configured to be flexible and have a bag shape, and a side of an upper edge thereof is fixed to the side of the body of the vehicle on the side of the upper edge of the window at a plurality of positions in a front-rear direction of the vehicle, and
wherein the airbag is provided with an end-side inflation portion that is disposed on a front end side when inflation is completed and is partitioned from a normal inflation portion by a partition portion that is disposed on a rear side,
wherein the end-side inflation portion has a configuration in which an upper part thereof that is disposed on an upper end side when the inflation is completed is disposed to project more toward the vehicle interior side than a lower part that is disposed on a lower end side when the inflation is completed,
wherein the upper part is configured to be disposed in a state in which a region from an upper rear side of the partition portion to a lower front side of the partition portion is inflated and is configured to maintain a projection state toward the vehicle interior side when the inflation is completed, by maintaining means,
wherein the maintaining means is configured to be capable of maintaining a disposition state in which a vicinity of an upper front end of the end-side inflation portion of the airbag which is in a flatly deployed state is displaced toward a lower rear side toward the vehicle interior side,
wherein the partition portion is configured to have a vertical bar portion that is disposed to be substantially parallel to an up-down direction so as to form a partition between the end-side inflation portion and the normal inflation portion and a cross bar portion that extends rearward from the upper end of the vertical bar portion,
wherein a distal end of the cross bar portion is disposed at a position having a height equal to or greater than that of the upper end of the vertical bar portion, and
wherein the cross bar portion is disposed to be substantially parallel to the front-rear direction.

4. The head protective airbag apparatus according to claim 3,
wherein the cross bar portion is formed to extend from the upper end of the vertical bar portion toward an upper rear side such that a distal end of the cross bar portion is positioned above the upper end of the vertical bar portion.

5. The head protective airbag apparatus according to claim 1,
wherein the connection member is arranged to extend upward from the base side in a state in which the bag main body is in the flatly deployed state.

6. A head protective airbag apparatus comprising:
an airbag that is configured to be folded and stored on a side of an upper edge of a window on a vehicle interior side of a vehicle in which a side of an upper edge of the airbag is attached and fixed to a side of a body of the vehicle and an inflating gas is caused to flow into an inside of the airbag such that the airbag is deployed and inflated to cover a vehicle interior side of the window while projecting downward; and
an inflator that supplies the inflating gas to the airbag,
wherein the airbag is configured to be flexible and have a bag shape, and a side of an upper edge thereof is fixed to the side of the body of the vehicle on the side of the upper edge of the window at a plurality of positions in a front-rear direction of the vehicle, and
wherein the airbag is provided with an end-side inflation portion that is disposed on a front end side when inflation is completed and is partitioned from a normal inflation portion by a partition portion that is disposed on a rear side,
wherein the end-side inflation portion has a configuration in which an upper part thereof that is disposed on an upper end side when the inflation is completed is disposed to project more toward the vehicle interior side than a lower part that is disposed on a lower end side when the inflation is completed,
wherein the upper part is configured to be disposed in a state in which a region from an upper rear side of the partition portion to a lower front side of the partition portion is inflated and is configured to maintain a projection state toward the vehicle interior side when the inflation is completed, by maintaining means, and
wherein the maintaining means is configured to be capable of maintaining a disposition state in which a vicinity of an upper front end of the end-side inflation portion of the airbag which is in a flatly deployed state is displaced toward a lower rear side toward the vehicle interior side,
wherein the partition portion has a vertical bar portion that is disposed to be substantially parallel to an up-down direction so as to form a partition between the end-side inflation portion and the normal inflation portion and a cross bar portion that extends to be substantially parallel to the front-rear direction so as to be separated from the vertical bar portion and oriented from an upper side toward the rear side of the vertical bar portion,
wherein a rear end of the cross bar portion is disposed at a position having a height equal to or greater than that of a front end thereof, and
wherein the cross bar portion is formed to extend obliquely from the upper side toward an upper rear side of the vertical bar portion.

* * * * *